United States Patent
Iikura et al.

(10) Patent No.: US 11,003,379 B2
(45) Date of Patent: May 11, 2021

(54) MIGRATION CONTROL APPARATUS AND MIGRATION CONTROL METHOD

(71) Applicant: FUJITSU LIMITED, Kawasaki (JP)

(72) Inventors: Fumi Iikura, Shinagawa (JP); Shingo Okuno, Kawasaki (JP); Yukihiro Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 176 days.

(21) Appl. No.: 16/512,475

(22) Filed: Jul. 16, 2019

(65) Prior Publication Data

US 2020/0026454 A1 Jan. 23, 2020

(30) Foreign Application Priority Data

Jul. 23, 2018 (JP) .............................. JP2018-137715

(51) Int. Cl.
*G06F 9/455* (2018.01)
*G06F 3/06* (2006.01)

(52) U.S. Cl.
CPC .......... *G06F 3/0647* (2013.01); *G06F 3/0611* (2013.01); *G06F 3/0665* (2013.01); *G06F 3/0683* (2013.01); *G06F 9/45558* (2013.01); *G06F 2009/4557* (2013.01)

(58) Field of Classification Search
CPC .................................................. G06F 9/45558
USPC ............................................................. 718/1
See application file for complete search history.

(56) References Cited

U.S. PATENT DOCUMENTS

| | | | |
|---|---|---|---|
| 10,884,777 B2* | 1/2021 | Iikura | G06F 9/45558 |
| 2011/0225285 A1* | 9/2011 | Patel | G06F 9/4856 709/224 |
| 2012/0221710 A1* | 8/2012 | Tsirkin | G06F 9/4856 709/224 |
| 2013/0346613 A1* | 12/2013 | Tarasuk-Levin | G06F 9/4856 709/226 |
| 2014/0108854 A1* | 4/2014 | Antony | G06F 11/203 714/4.2 |
| 2014/0208315 A1* | 7/2014 | Abali | G06F 9/45558 718/1 |

(Continued)

FOREIGN PATENT DOCUMENTS

| | | |
|---|---|---|
| JP | 2013-047920 | 3/2013 |
| JP | 2015-156585 | 8/2015 |
| JP | 2016-184252 | 10/2016 |

*Primary Examiner* — Mehran Kamran
(74) *Attorney, Agent, or Firm* — Fujitsu Patent Center

(57) ABSTRACT

A migration control apparatus includes a processor configured to, acquire a first communication log regarding a first virtual machine when execution of migration of the first virtual machine is not completed in a specific time, perform calculation of a first response time of a first processing request to the first virtual machine, acquire a second communication log regarding the first virtual machine after lowering frequency of assignment of a computing resource to the first virtual machine to a first rate, perform calculation of a second response time of a second processing request to the first virtual machine, calculate a second rate to which the frequency of assignment of the computing resource is permitted to be lowered, after starting re-execution of the migration, perform calculation of a third rate of the frequency of assignment of the computing resource for completing the re-execution, and perform determination of whether to cease the re-execution.

19 Claims, 24 Drawing Sheets

(56) References Cited

U.S. PATENT DOCUMENTS

| | | | |
|---|---|---|---|
| 2014/0359607 A1* | 12/2014 | Tsirkin | G06F 9/45533 718/1 |
| 2015/0007178 A1* | 1/2015 | Kaneko | G06F 9/5088 718/1 |
| 2015/0143364 A1* | 5/2015 | Anderson | G06F 9/45558 718/1 |
| 2015/0193250 A1* | 7/2015 | Ito | G06F 9/45558 718/1 |
| 2015/0261581 A1* | 9/2015 | Wang | G06F 3/0619 711/162 |
| 2017/0315839 A1* | 11/2017 | Zhang | G06F 9/455 |
| 2018/0150335 A1* | 5/2018 | Doi | G06F 11/3089 |
| 2018/0246751 A1* | 8/2018 | Dong | G06F 9/505 |
| 2019/0095233 A1* | 3/2019 | Iikura | G06F 11/3419 |
| 2020/0341797 A1* | 10/2020 | Tsirkin | G06F 15/17331 |

* cited by examiner

FIG. 16

| MIGRATION SOURCE PM | TARGET VM | MIGRATION DESTINATION PM | START CLOCK TIME (SCHEDULED) | EXECUTION TIME (SCHEDULED) | START CLOCK TIME | EXECUTION TIME | RESULT |
|---|---|---|---|---|---|---|---|
| PM1 | ABC | PM2 | 9:00 | 20 | — | — | — |
| PM1 | DEF | PM3 | 9:20 | 40 | — | — | — |
| ⋮ | ⋮ | ⋮ | ⋮ | ⋮ | ⋮ | ⋮ | ⋮ |
| PM1 | XYZ | PM2 | 11:50 | 10 | — | — | — |

FIG. 17

| MIGRATION SOURCE PM | TARGET VM | MIGRATION DESTINATION PM | START CLOCK TIME (SCHEDULED) | EXECUTION TIME (SCHEDULED) | START CLOCK TIME | EXECUTION TIME | RESULT |
|---|---|---|---|---|---|---|---|
| PM1 | ABC | PM2 | 9:00 | 20 | 9:00 | 15 | SUCCESS |
| PM1 | DEF | PM3 | 9:20 | 40 | 9:15 | MORE THAN 60 | FAILURE |
| ... | ... | ... | ... | ... | ... | ... | ... |
| PM1 | XYZ | PM2 | 11:50 | 10 | 12:40 | 10 | SUCCESS |

FIG. 18

| CONTENTS |
|---|
| 11:38:37.060846 IP client2.63396 > host1.8081: Flags [S], seq 3907359389, win 8192, options [mss 1460,nop,wscale 8,nop,nop,sackOK], length 0 |
| 11:38:37.078862 IP client2.63396 > host1.8081: Flags [F.], seq 358, ack 21513, win 256, length 0 |
| 11:38:37.221961 IP client2 > host1.8081: Flags [S], seq 1048295468, win 8192, options [mss 1460,nop,wscale 8,nop,nop,sackOK], length 0 |
| 11:38:37.239833 IP client2.63397 > host1.8081: Flags [F.], seq 358, ack 21513, win 252, length 0 |
| ... |

FIG. 19

| SLOWDOWN RATE (%) | RESPONSE TIME (ms) |
|---|---|
| 0 | 18 |
| 10 | 20 |

FIG. 20

| CLOCK TIME | STATUS | LOWERING RATE OF FREQUENCY OF ALLOCATION (%) | TRANSFERRED DATA (MiB) | GENERATED DIRTY PAGE (MiB) |
|---|---|---|---|---|
| 10:11:00 | LM START | 10 | – | – |
| 10:11:32 | Iter 1 | 20 | 32000 | 17920 |

FIG. 21

| CLOCK TIME | STATUS | LOWERING RATE OF FREQUENCY OF ALLOCATION (%) | TRANSFERRED DATA (MiB) | GENERATED DIRTY PAGE (MiB) |
|---|---|---|---|---|
| 10:11:00 | LM START | 10 | – | – |
| 10:11:32 | Iter 1 | 20 | 32000 | 17920 |
| 10:11:50 | Iter 2 | 30 | 17920 | 8781 |

FIG. 22

| CLOCK TIME | STATUS | LOWERING RATE OF FREQUENCY OF ALLOCATION (%) | TRANSFERRED DATA (MiB) | GENERATED DIRTY PAGE (MiB) |
|---|---|---|---|---|
| 10:11:00 | LM START | 10 | – | – |
| 10:11:32 | Iter 1 | 20 | 32000 | 17920 |
| 10:11:50 | Iter 2 | 30 | 17920 | 8781 |
| 10:12:02 | Iter 3 | 40 | 8781 | 3688 |
| 10:12:03 | Iter 4 | 50 | 3688 | 1291 |
| 10:12:04 | Iter 5 | 60 | 1291 | 3688 |
| 10:12:04 | Iter 6 | 70 | 361 | 76 |
| 10:12:04 | Iter 7 | 80 | 76 | 11 |

FIG. 23

```
INFORMATION ON VM :
 RESPONSE TIME (NORMAL) : 18ms
 TIMEOUT OF RESPONSE TIME : 300ms
 PERMISSIBLE SLOWDOWN : 94%

PROGRESS OF LM :
 Iteration : ONE TIME
 SLOWDOWN : 20%
 TRANSFERRED DATA : 32000MiB
 GENERATED DIRTY PAGE : 17920MiB
 PREDICTED Iteration : SEVEN TIMES
 PREDICTED SLOWDOWN : 80%
 STATUS: LM IS CONTINUED BECAUSE IT IS ANTICIPATED THAT INFLUENCE ON
         BUSINESS DOES NOT OCCUR
```

FIG. 24

```
INFORMATION ON VM :
 RESPONSE TIME (NORMAL) : 18ms
 TIMEOUT OF RESPONSE TIME : 300ms
 PERMISSIBLE SLOWDOWN : 94%

PROGRESS OF LM :
 Iteration : ONE TIME
 SLOWDOWN : 20%
 TRANSFERRED DATA : 32000MiB
 GENERATED DIRTY PAGE : 28160MiB
 PREDICTED Iteration : NINE TIMES
 PREDICTED SLOWDOWN : 99%
 STATUS: LM IS SUSPENDED BECAUSE IT IS ANTICIPATED THAT INFLUENCE ON
         BUSINESS OCCURS
```

MIGRATION CONTROL APPARATUS AND MIGRATION CONTROL METHOD

CROSS-REFERENCE TO RELATED APPLICATION

This application is based upon and claims the benefit of priority of the prior Japanese Patent Application No. 2018-137715, filed on Jul. 23, 2018, the entire contents of which are incorporated herein by reference.

FIELD

The embodiments discussed herein are related to a migration control technique.

BACKGROUND

For example, a cloud computing user that provides services to users constructs and runs an information processing system for providing various services. For example, the cloud computing user constructs the information processing system by renting a virtual machine (VM) from a cloud computing business operator that carries out lending of the virtual machine.

In the above-described information processing system, for example, when a physical machine is desired to be stopped for carrying out maintenance or the like, the cloud computing business operator carries out live migration in which a virtual machine that is running is moved to another physical machine without being stopped. Due to this, in the migration control system, it becomes possible to keep services provided to users from being affected even when stop or the like of a physical machine is carried out.

For example, related arts are disclosed in Japanese Laid-open Patent Publications No. 2015-156585, No. 2016-184252, and No. 2013-047920.

SUMMARY

According to an aspect of the embodiments, a migration control apparatus includes a processor configured to, acquire a first communication log regarding a first virtual machine when execution of migration of the first virtual machine is not completed in a specific time, perform calculation of a first response time of a first processing request to the first virtual machine, acquire a second communication log regarding the first virtual machine after lowering frequency of assignment of a computing resource to the first virtual machine to a first rate, perform calculation of a second response time of a second processing request to the first virtual machine, calculate a second rate to which the frequency of assignment of the computing resource is permitted to be lowered, after start of re-execution of the migration, perform calculation of a third rate of the frequency of assignment of the computing resource for completing the re-execution, and perform determination of whether to cease the re-execution.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a diagram explaining a specific example of a plan information;

FIG. 17 is a diagram explaining a specific example of a plan information;

FIG. 18 is a diagram explaining a specific example of communication logs;

FIG. 19 is a diagram explaining a specific example of influence prediction information;

FIG. 20 is a diagram explaining a specific example of LM logs;

FIG. 21 is a diagram explaining a specific example of LM logs;

FIG. 22 is a diagram explaining a specific example of LM logs;

FIG. 23 is a diagram explaining a specific example when a determination result output in processing of S55 is output to output apparatus; and FIG. 24 is a diagram explaining a specific example when a determination result output in processing of S55 is output to output apparatus.

DESCRIPTION OF EMBODIMENTS

Here, in a virtual machine of a live migration target, data is updated even in execution of the live migration. For this reason, in the live migration, if data that has been transferred to another physical machine is updated, retransfer about the data is carried out. Therefore, in the information processing system, there is a possibility that the live migration is not completed in a desired time (for example, in a time defined in advance by the cloud computing business operator) if the frequency of update of data in execution of the live migration is high.

Thus, the cloud computing business operator carries out slowdown of a virtual machine by lowering the frequency of assignment of a central processing unit (CPU) to the virtual machine of the live migration target, for example. This allows the cloud computing business operator to suppress the frequency of update of data in the virtual machine of the live migration target.

However, in the case of carrying out the slowdown of the virtual machine of the live migration target, the execution speed of processing of providing services to users becomes lower in the virtual machine of the live migration target. For this reason, there is a possibility that the execution of the live migration affects the services for users in the information processing system.

Figure 1:
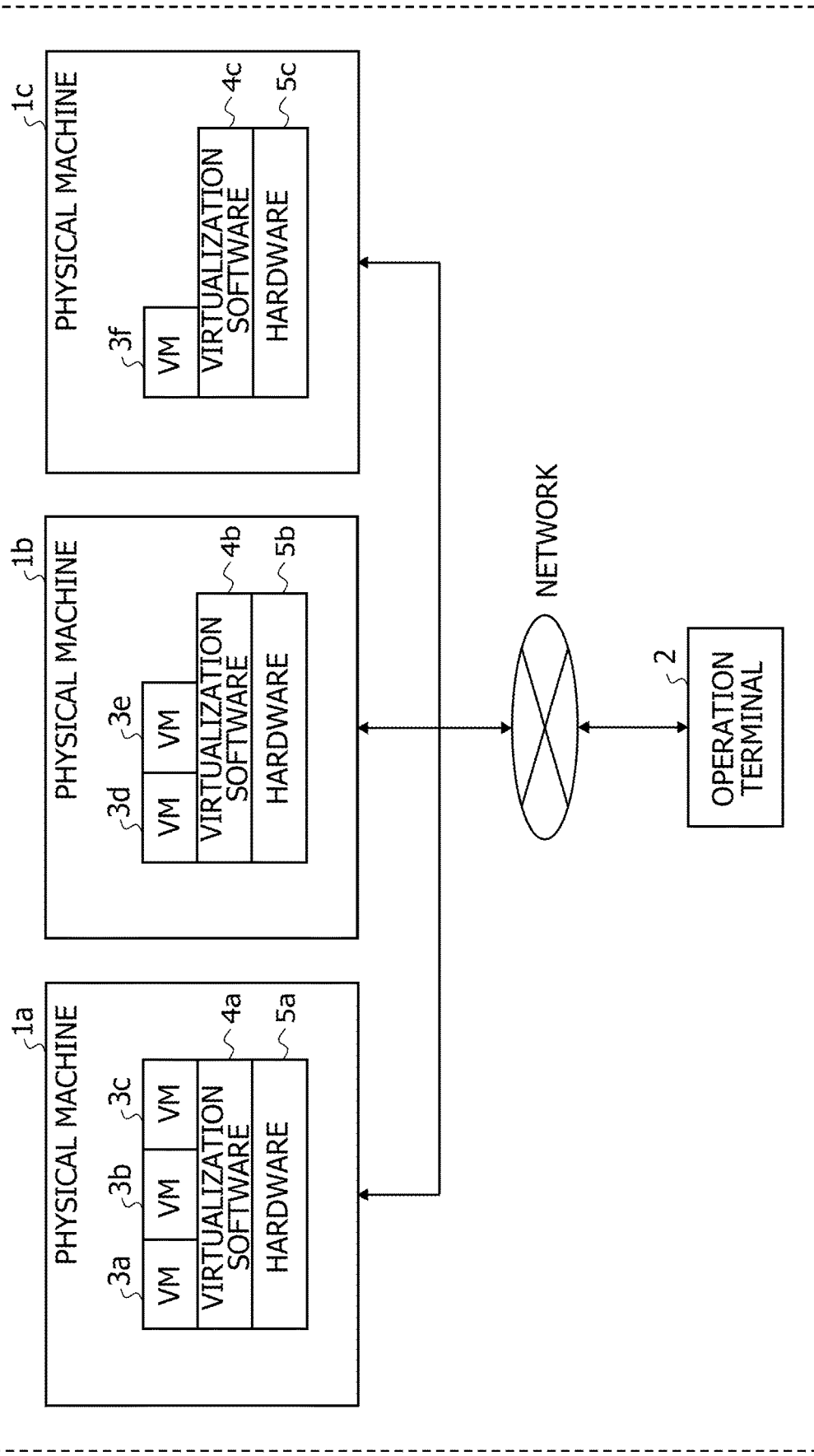
FIG. 1 is a diagram explaining a configuration of a migration control system.
Figure 2:
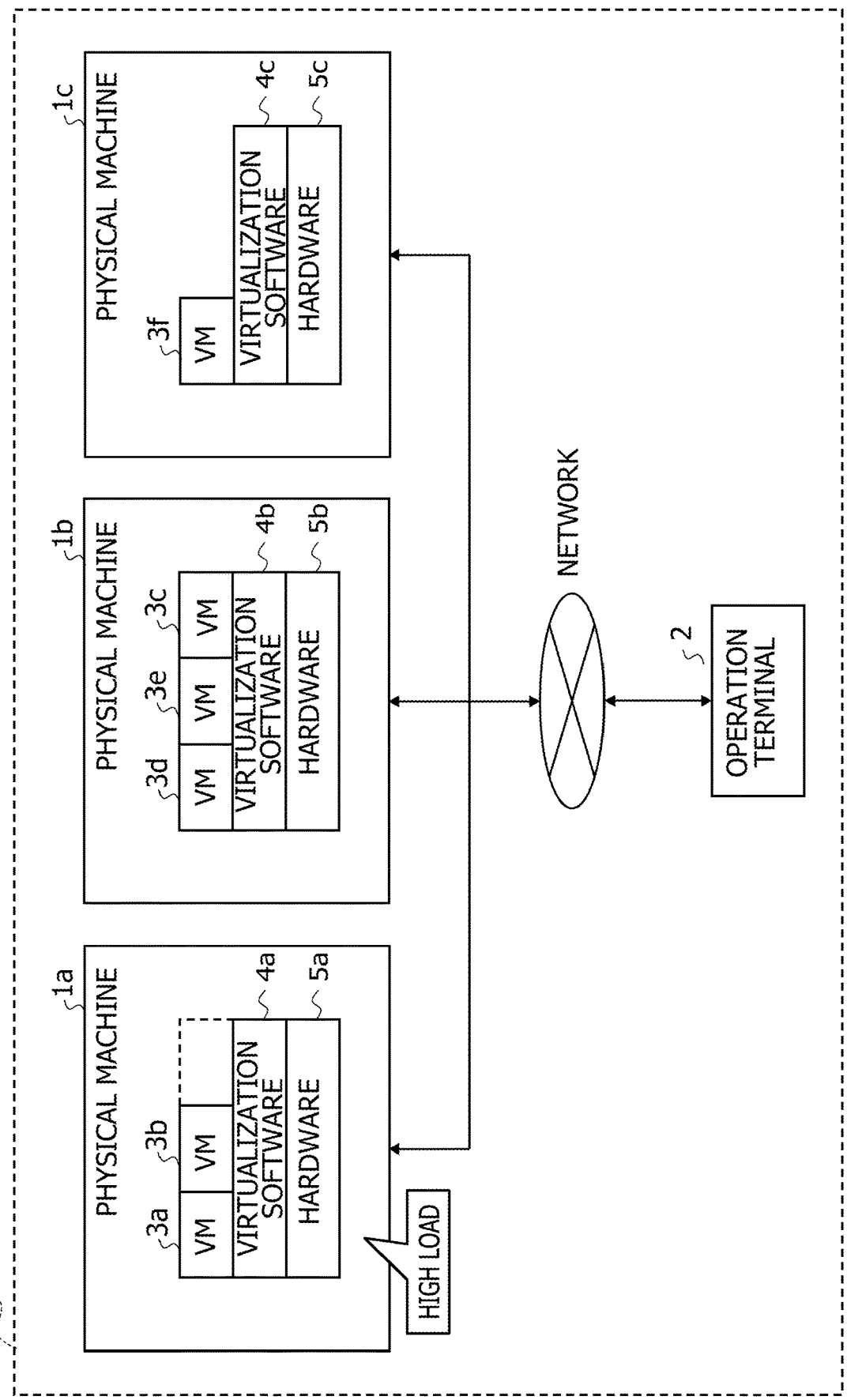
FIG. 2 is a diagram explaining a configuration of a migration control system.

First, the configuration of a migration control system 10 will be described. FIG. 1 and FIG. 2 are diagrams explaining the configuration of the migration control system 10. The migration control system 10 illustrated in FIG. 1 and FIG. 2 includes physical machines 1a, 1b, and 1c and an operation terminal 2. The physical machines 1a, 1b, and 1c are one example of migration control apparatus.

For example, the operation terminal 2 is a personal computer (PC) used by a cloud computing user and is a terminal that accesses the physical machines 1a, 1b, and 1c through a network NW such as the Internet.

The physical machines 1a, 1b, and 1c include pieces of hardware 5a, 5b, and 5c, respectively, including CPU, memory (dynamic random access memory (DRAM)), hard disk (hard disk drive (HDD)), network, and so forth. Furthermore, in the physical machines 1a, 1b, and 1c, pieces of virtualization software 4a, 4b, and 4c, respectively, operate on the pieces of hardware 5a, 5b, and 5c as illustrated in FIG. 1.

The virtualization software 4a executes processing of generating VMs 3a, 3b, and 3c by assigning part of the hardware 5a, for example. Furthermore, the virtualization software 4b executes processing of generating VMs 3d and 3e by assigning part of the hardware 5b, for example. In addition, each of the VMs 3a, 3b, 3c, 3d, and 3e executes processing of providing services to users, for example.

Moreover, the virtualization software 4c executes processing of generating a VM 3f (hereinafter, referred to also as management VM 3f) by assigning part of the hardware 5c. Furthermore, the management VM 3f executes processing of controlling live migration and so forth of the VMs 3a, 3b, 3c, 3d, and 3e, for example. For example, as illustrated in FIG. 2, when detecting that the processing load of the physical machine 1a has become higher than a given threshold, the management VM 3f migrates the VM 3c that is operating on the physical machine 1a to the physical machine 1b by making an instruction to the virtualization software 4a.

Hereinafter, the physical machines 1a, 1b, and 1c will be collectively referred to also as the physical machine 1 simply. The VMs 3a, 3b, 3c, 3d, 3e, and 3f will be collectively referred to also as the VM 3 simply. The pieces of virtualization software 4a, 4b, and 4c will be collectively referred to also as the virtualization software 4 simply. The pieces of hardware 5a, 5b, and 5c will be collectively referred to also as the hardware 5 simply.

Furthermore, hereinafter, the description will be made based on the assumption that management of the VMs 3a, 3b, 3c, 3d, and 3e is carried out by the cloud computing user and management of the virtualization software 4, the hardware 5, and the management VM 3f is carried out by the cloud computing business operator. For example, hereinafter, the description will be made based on the assumption that it is difficult for the cloud computing business operator to acquire various kinds of information by directly accessing the VMs 3a, 3b, 3c, 3d, and 3e.

Here, in the VM 3 of the live migration target, data is updated even in execution of the live migration. For this reason, in the live migration of the VM 3, if data that has been already transferred to another physical machine 1 is updated, retransfer is desired to be carried out about the updated data. Therefore, in the migration control system 10, there is a possibility that the completion time of the live migration becomes longer than the initial predicted time if the frequency of update of data in execution of the live migration is high.

Thus, in this case, for example, the cloud computing user carries out slowdown of the VM 3 (processing speed of the VM 3) by lowering the frequency of assignment (time of assignment) of the CPU to the VM 3 of the live migration target. This allows the cloud computing user to suppress the frequency of update of data carried out in the VM 3 of the live migration target.

However, in the case of carrying out the slowdown of the VM 3 of the live migration target, the execution speed of processing of providing services to users becomes lower in the VM 3 of the live migration target. For this reason, there is a possibility that the execution of the live migration affects the services for users in the migration control system 10.

Thus, if execution of live migration of the VM 3 of the live migration target (hereinafter, referred to also as target VM 3) is not completed in a given time, the management VM 3f in the present embodiment acquires communication logs about the target VM 3 (hereinafter, referred to also as first communication logs). Then, the management VM 3f calculates the response time of a processing request to the target VM 3 (hereinafter, referred to also as first response time) based on the acquired first communication logs.

Subsequently, the management VM 3f lowers the frequency of assignment of the CPU to the target VM 3 and thereafter acquires communication logs about the target VM 3 (hereinafter, referred to also as second communication logs). Then, the management VM 3f calculates a second response time of a processing request to the target VM 3 based on the acquired second communication logs.

Thereafter, the management VM 3f calculates the rate by which the frequency of assignment may be lowered (hereinafter, referred to also as first rate) based on the rate by which the frequency of assignment has been lowered, the first response time, the second response time, and the time permitted as the response time of a processing request to the target VM 3. Then, after start of re-execution of the live migration of the target VM 3, the management VM 3f calculates the rate by which the frequency of assignment is desired to be lowered for completing the re-execution (hereinafter, referred to also as second rate) based on the progress status of the re-execution. Moreover, the management VM 3f determines whether or not to cease the re-execution of the live migration based on the first rate and the second rate.

For example, the management VM 3f carries out slowdown of the target VM 3 in a range in which the response time with respect to a processing request from a user does not exceed the permitted time and suppresses the frequency of update of data in execution of the live migration of the target VM 3.

This allows the management VM 3f to complete the live migration of the target VM 3 while keeping the services provided to users by the cloud computing user from being affected. For example, it becomes possible for the management VM 3f to complete the live migration of the target VM 3 while suppressing the occurrence of an error and so forth associated with delay in the response time of a processing request from a user to the target VM 3, for example.

Figure 3:
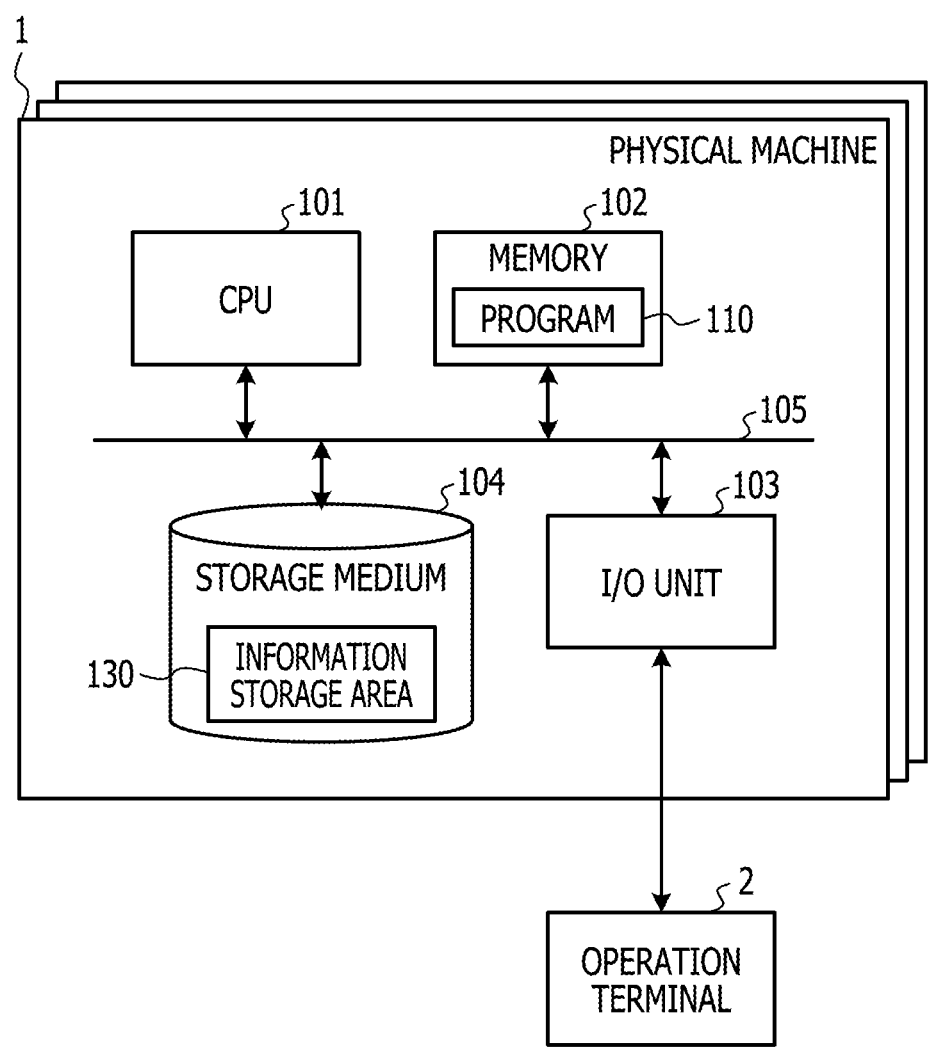
FIG. 3 is a diagram explaining a hardware configuration of a physical machine.

Next, the hardware configuration of the migration control system 10 will be described. FIG. 3 is a diagram explaining the hardware configuration of the physical machine 1.

As illustrated in FIG. 3, the physical machine 1 includes a CPU 101 that is a processor, a memory 102, an external interface (I/O unit) 103, and a storage medium 104. The respective units are coupled to each other through a bus 105.

The storage medium 104 includes a program storage area (not illustrated) that stores a program 110 for executing processing of controlling live migration of the target VM 3 (hereinafter, referred to also as live migration control processing or LM control processing), for example. Furthermore, the storage medium 104 includes a storing unit 130 (hereinafter, referred to also as information storage area 130) that stores information used when the LM control processing is executed, for example. The storage medium 104 may be an HDD, for example.

The CPU 101 executes the program 110 loaded from the storage medium 104 into the memory 102 to execute the LM control processing.

Furthermore, the external interface 103 carries out communication with the operation terminal 2, for example.

Figure 4:
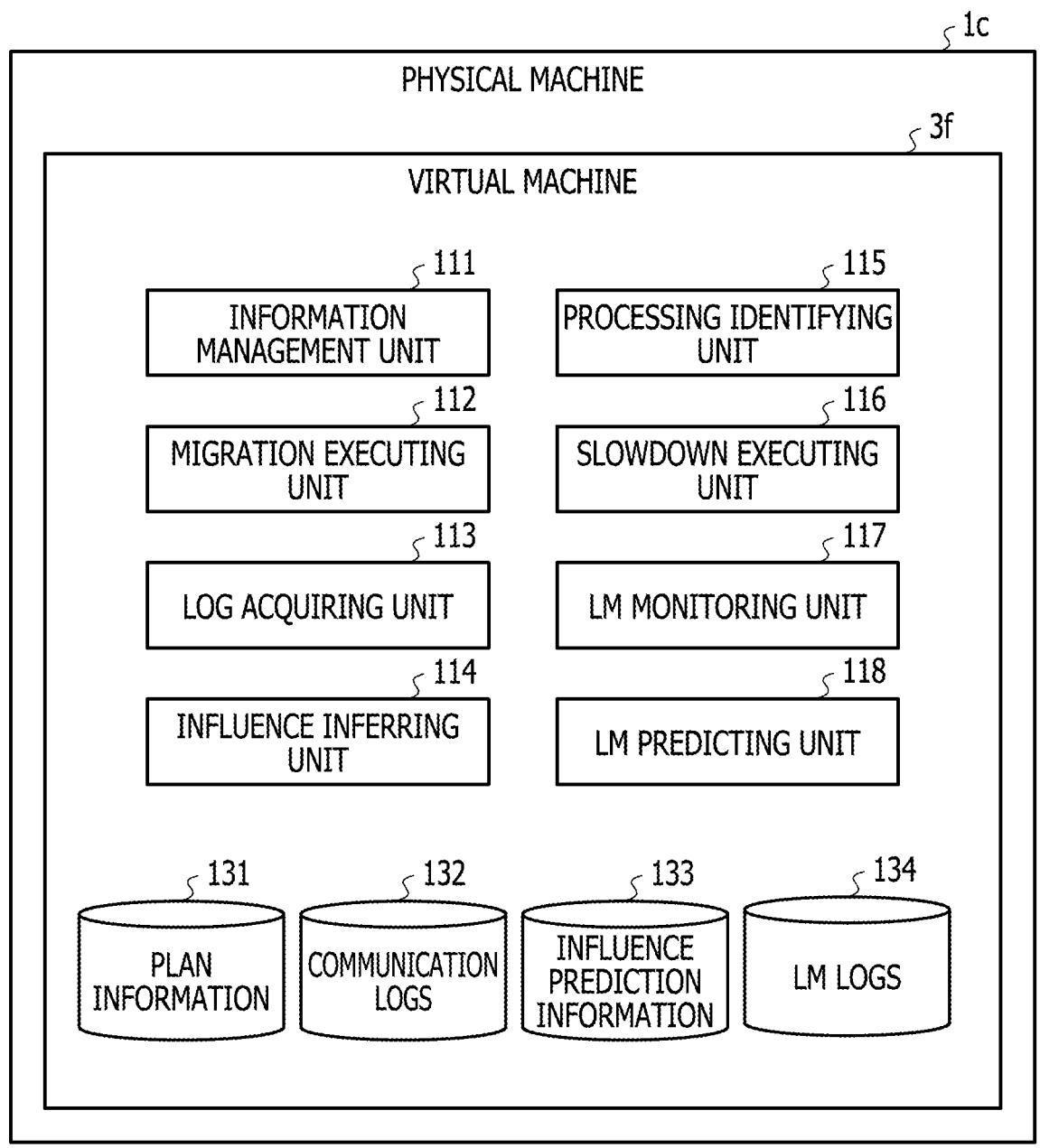
FIG. 4 is a block diagram of functions of a management VM.

Next, functions of the migration control system 10 will be described. FIG. 4 is a block diagram of functions of the management VM 3f.

As illustrated in FIG. 4, through organic cooperation between pieces of hardware such as the CPU 101 and the memory 102 of the physical machine 1c and the program 110, the management VM 3f implements various functions including an information management unit 111, a migration executing unit 112, a log acquiring unit 113, an influence inferring unit 114, a processing identifying unit 115, a slowdown executing unit 116, an LM monitoring unit 117, and an LM predicting unit 118.

Furthermore, the management VM 3f stores plan information 131, communication logs 132, an influence prediction information 133, and LM logs 134 in the information storage area 130 as illustrated in FIG. 4.

The information management unit 111 stores the plan information 131 in the information storage area 130. The plan information 131 is information that represents an execution plan of live migration of the target VM 3 and is information generated by a cloud computing business operator in advance, for example.

The migration executing unit 112 executes live migration of the target VM 3 in accordance with the plan information 131 stored in the information storage area 130.

For example, if the migration executing unit 112 detects that the execution of the live migration of the target VM 3 is not completed in a given time, the log acquiring unit 113 acquires the first communication logs 132 about the target VM 3.

The influence inferring unit 114 calculates the response time of a processing request to the target VM 3 (hereinafter, referred to also as first response time) based on the first communication logs 132 acquired by the log acquiring unit 113.

The processing identifying unit 115 determines whether or not the target VM 3 is the VM 3 that executes processing for a processing request transmitted from the operation terminal 2 based on the first communication logs 132 acquired by the log acquiring unit 113.

The slowdown executing unit 116 carries out slowdown of the target VM 3 by lowering the frequency of assignment of the CPU (CPU of the physical machine 1 on which the target VM 3 is generated) to the target VM 3. For example, if it is determined by the processing identifying unit 115 that the target VM 3 is the VM 3 that executes processing for a processing request, the slowdown executing unit 116 instructs the virtualization software 4 to carry out slowdown of the target VM 3. The CPU assigned to the target VM 3 may be a virtual central processing unit (VCPU) formed of at least part of the CPU 101 explained with FIG. 3, for example.

Furthermore, after the slowdown executing unit 116 lowers the frequency of assignment of the CPU to the target VM 3, the log acquiring unit 113 acquires the second communication logs 132 about the target VM 3. Then, the influence inferring unit 114 calculates the response time of a processing request to the target VM 3 (hereinafter, referred to also as second response time) based on the second communication logs 132 acquired by the log acquiring unit 113.

Thereafter, the influence inferring unit 114 calculates the first rate by which the frequency of assignment of the CPU to the target VM 3 may be lowered based on the rate by which the frequency of assignment of the CPU has been lowered by the slowdown executing unit 116, the first response time, the second response time, and the time permitted as the response time of a processing request to the target VM 3.

After the migration executing unit 112 starts re-execution of the live migration of the target VM 3, the LM monitoring unit 117 calculates the second rate by which the frequency of assignment of the CPU is desired to be lowered for completing the re-execution of the live migration based on the progress status of the re-execution of the live migration.

The LM predicting unit 118 determines whether or not to cease the re-execution of the live migration based on the first rate calculated by the influence inferring unit 114 and the second rate calculated by the LM monitoring unit 117. A description about specific examples of the influence prediction information 133 and the LM logs 134 will be made later.

Figure 5:
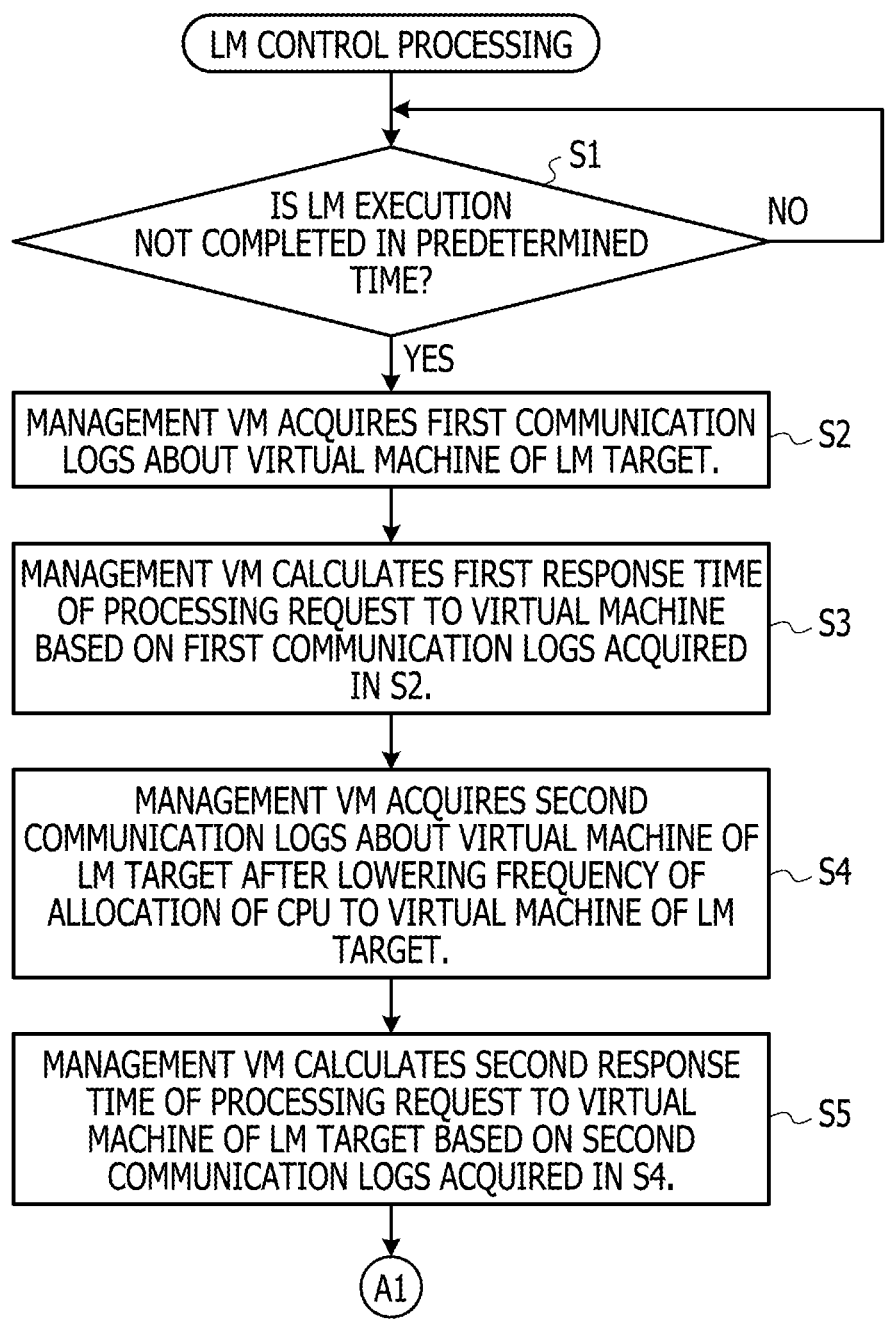
FIG. 5 is a flowchart diagram explaining an outline of LM control processing in a first embodiment.
Figure 6:
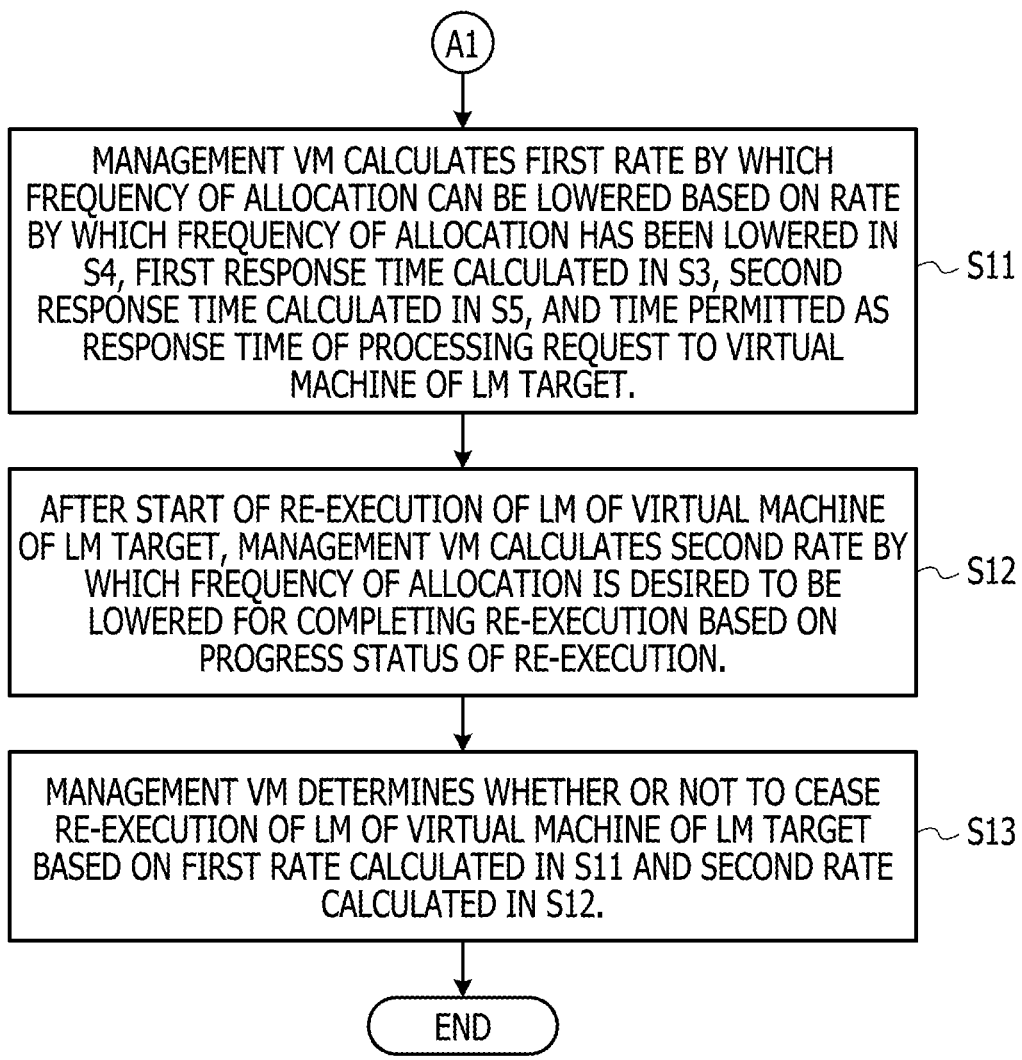
FIG. 6 is a flowchart diagram explaining an outline of LM control processing in the first embodiment.
Figure 7:
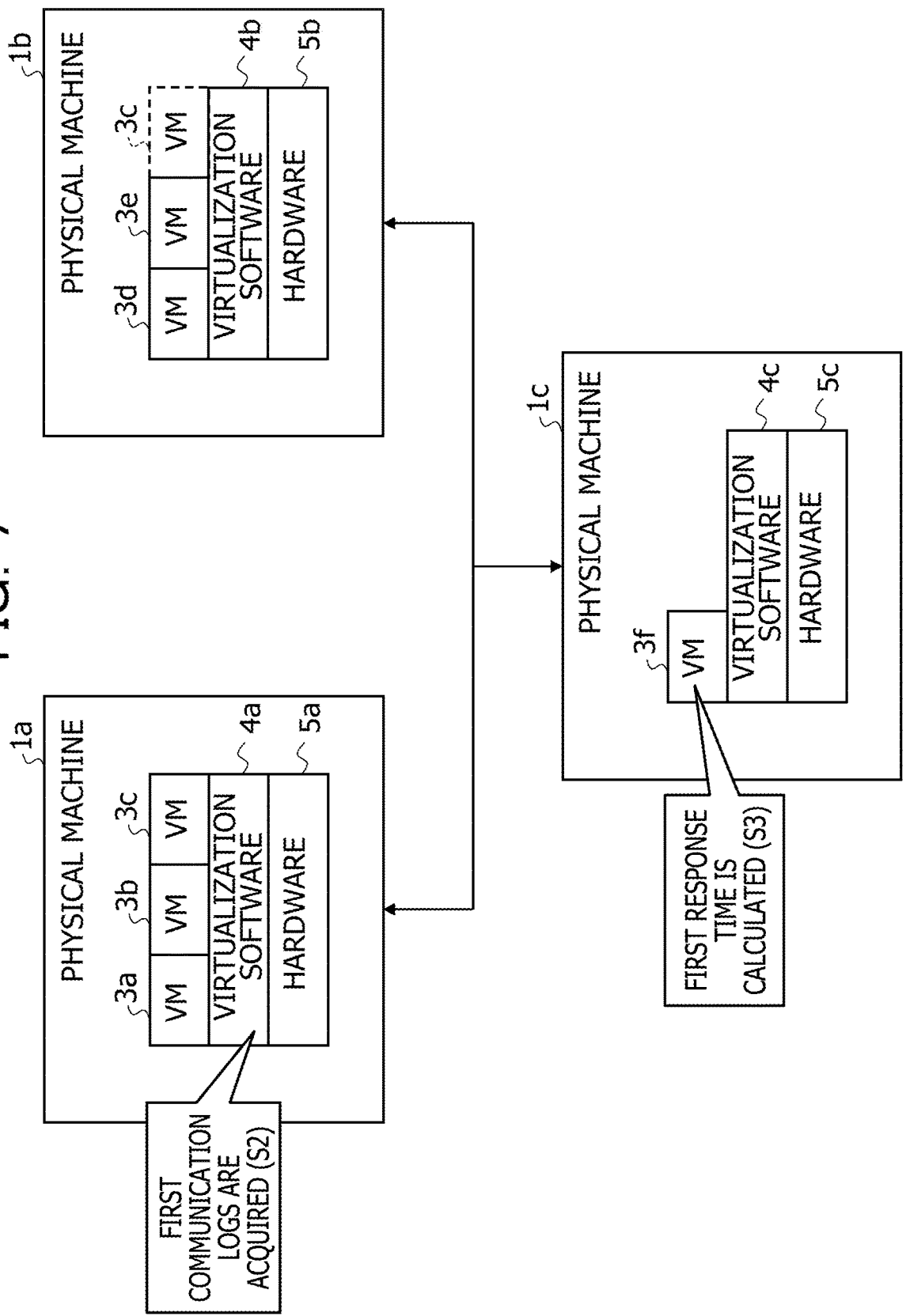
FIG. 7 is a diagram explaining an outline of an LM control processing in the first embodiment.
Figure 8:
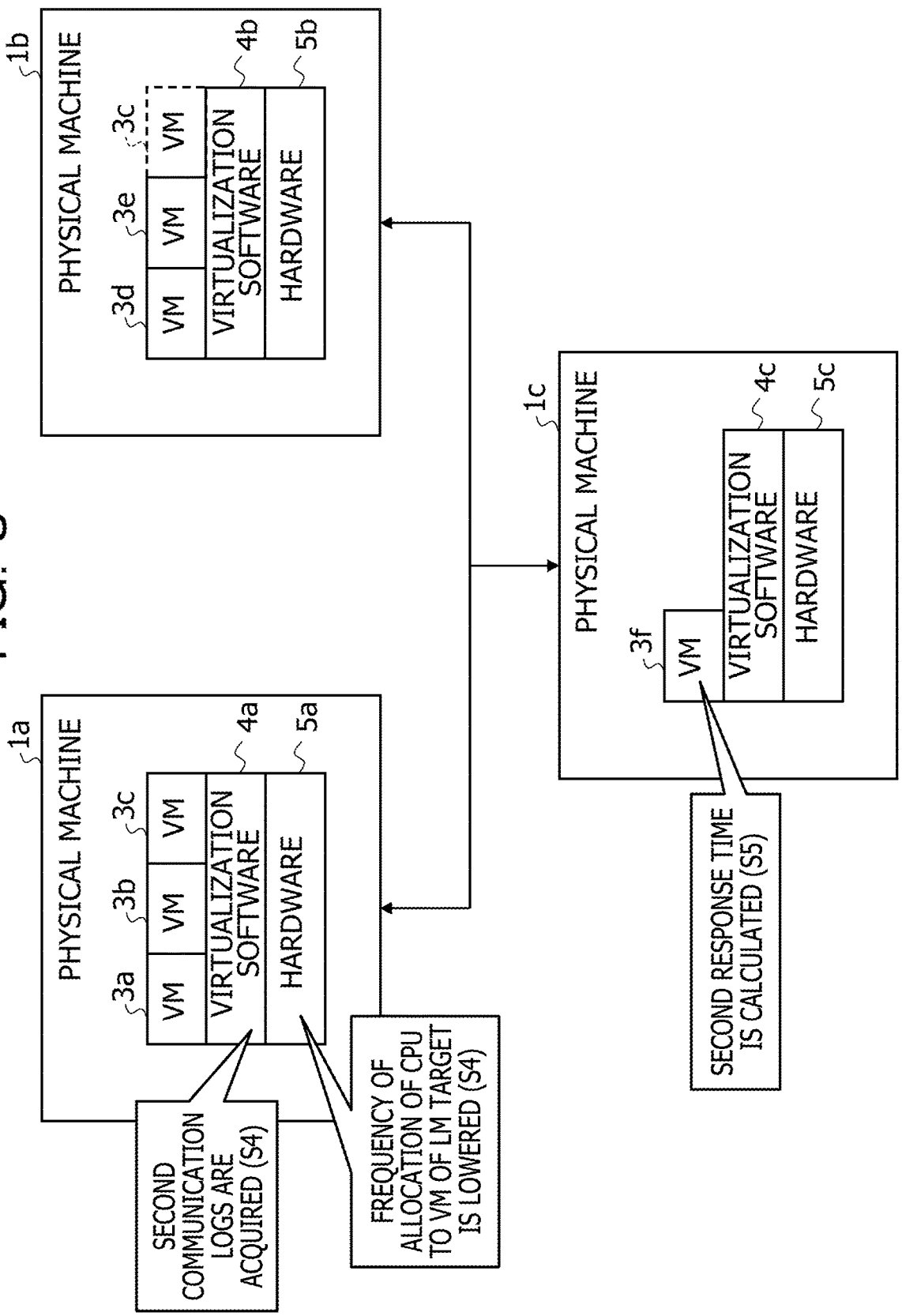
FIG. 8 is a diagram explaining an outline of an LM control processing in the first embodiment.
Figure 9:
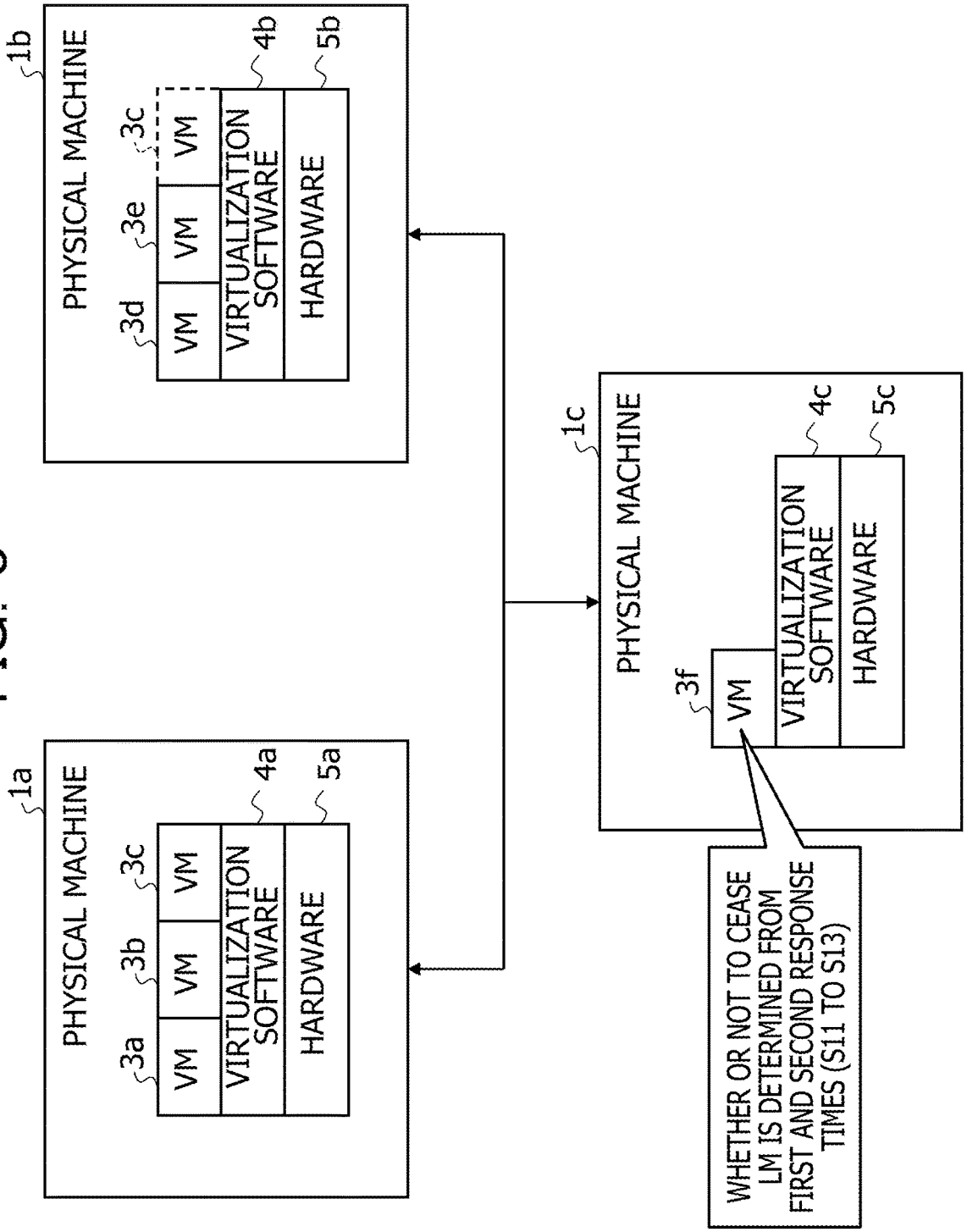
FIG. 9 is a diagram explaining an outline of an LM control processing in the first embodiment.

Next, the outline of a first embodiment will be described. FIG. 5 and FIG. 6 are flowchart diagrams explaining an outline of LM control processing in the first embodiment. Furthermore, FIG. 7 to FIG. 9 are diagrams explaining an outline of LM control processing in the first embodiment.

As illustrated in FIG. 5, the management VM 3f waits until detecting the target VM 3 about which execution of live migration is not completed in a given time (NO of S1).

Then, when detecting the target VM 3 about which execution of live migration is not completed in the given time (YES of S1), the management VM 3f acquires the first communication logs 132 about the target VM 3 (S2). The given time is a time defined in advance by a cloud computing business operator as the completion predicted time of the live migration, for example. For example, the given time may be a time common about live migration of all VMs 3 or be a time different for each of live migrations of the respective VMs 3.

Subsequently, the management VM 3f calculates the first response time of a processing request to the target VM 3 based on the first communication logs 132 acquired in the processing of S2 (S3).

For example, as illustrated in FIG. 7, for example, a management VM 3f acquires the first communication logs 132 about the VM 3c when detecting that live migration of the VM 3c from the physical machine 1a to the physical machine 1b is not completed in the given time. Then, the management VM 3f refers to the first communication logs 132 about the VM 3c and calculates the first response time of a processing request to the target VM 3.

For example, the VM 3c illustrated in FIG. 7 is the VM 3 managed by a cloud computing user. For this reason, it is difficult for the management VM 3f managed by the cloud computing business operator to acquire various kinds of information by directly accessing the VM 3c. On the other hand, the VM 3c goes through a virtual switch (not illustrated) and so forth generated by the virtualization software 4a when carrying out communication with the operation terminal 2 or the like. Thus, the management VM 3f acquires the first communication logs 132 about the VM 3c by accessing the virtual switch generated by the virtualization software 4a. Then, the management VM 3f calculates the first response time from the acquired first communication logs 132.

Subsequently, the management VM 3f acquires the second communication logs 132 about the target VM 3 after lowering the frequency of assignment of the CPU to the target VM 3 (S4). Then, the management VM 3f calculates the second response time of a processing request to the target VM 3 based on the second communication logs 132 acquired in the processing of S4 (S5).

For example, as illustrated in FIG. 8, for example, the management VM 3f acquires the second communication logs 132 about the VM 3c after lowering the frequency of assignment of the CPU to the VM 3c. Then, the management VM 3f refers to the second communication logs 132 about the VM 3c and calculates the second response time of a processing request to the target VM 3.

Thereafter, as illustrated in FIG. 6, the management VM 3f calculates the first rate by which the frequency of assignment of the CPU to the target VM 3 may be lowered based on the rate by which the frequency of assignment has been lowered in the processing of S4, the first response time calculated in the processing of S3, the second response time calculated in the processing of S5, and the time permitted as the response time of a processing request to the target VM 3 (S11).

For example, the management VM 3f calculates, as the first rate, the lowering rate with which it may be determined that the services to users are not affected in the case of lowering the frequency of assignment of the CPU to the target VM 3.

Then, after start of re-execution of the live migration of the target VM 3, the management VM 3f calculates the second rate by which the frequency of assignment is desired to be lowered for completing the re-execution of the live migration based on the progress status of the re-execution of the live migration (S12).

For example, the management VM 3f calculates the lowering rate of the frequency of assignment of the CPU desired for completing the live migration of the target VM 3.

Moreover, the management VM 3f determines whether or not to cease the re-execution of the live migration of the target VM 3 based on the first rate calculated in the processing of S11 and the second rate calculated in the processing of S12 (S13).

For example, as illustrated in FIG. 9, the management VM 3f calculates each of the first rate and the second rate about the VM 3 from the first response time and the second response time calculated about the VM 3. Then, for example, if the second rate is higher than the first rate, the management VM 3f determines to cease the live migration of the VM 3.

This allows the management VM 3f to complete the live migration of the target VM 3 while keeping the services provided to users by the cloud computing user from being affected. For example, it becomes possible for the management VM 3f to complete the live migration of the target VM 3 while suppressing the occurrence of an error and so forth associated with delay in the response time of a processing request from a user to the target VM 3, for example.

Next, details of the first embodiment will be described. FIG. 10 to FIG. 15 are flowchart diagrams explaining details of LM control processing in the first embodiment. Furthermore, FIG. 16 to FIG. 24 are diagrams explaining details of LM control processing in the first embodiment.

Figure 10:
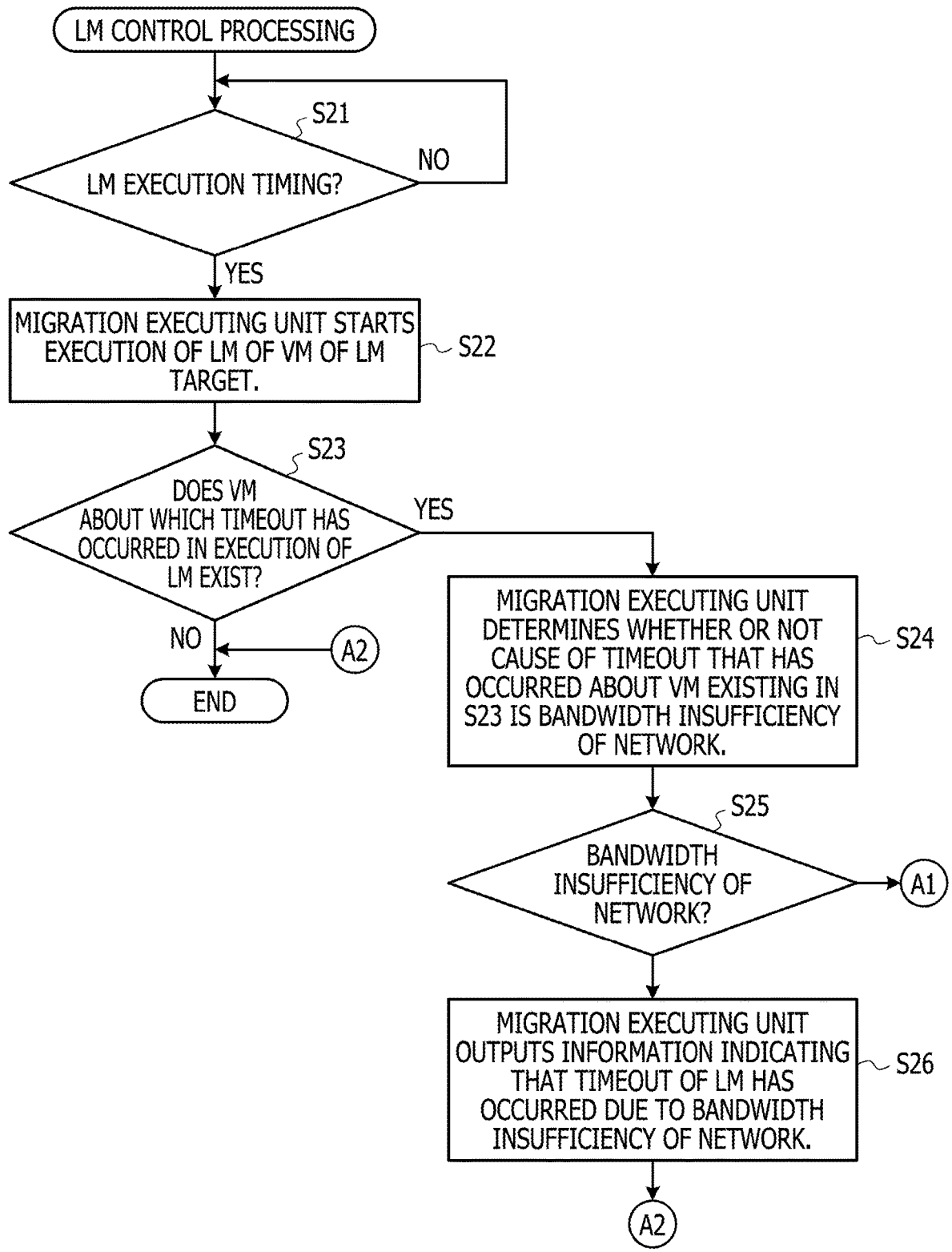
FIG. 10 is a flowchart diagram explaining details of an LM control processing in the first embodiment.

As illustrated in FIG. 10, the migration executing unit 112 of the management VM 3f waits until an LM execution timing comes (NO of S21). The LM execution timing is the timing when live migration of the VM 3 is started and is the timing about which information is included in the plan information 131 stored in the information storage area 130. Specific examples of the plan information 131 will be described below.

FIG. 16 and FIG. 17 are diagrams explaining the specific examples of the plan information 131. The plan information 131 illustrated in FIG. 16 and so forth includes, as items, "migration source PM" in which identification information of the physical machine 1 of the migration source of live migration is stored, "target VM" in which identification information of the target VM 3 of live migration is stored, and "migration destination PM" in which identification information of the physical machine 1 of the migration destination of live migration is stored. Furthermore, the plan information 131 illustrated in FIG. 16 and so forth includes, as items, "start clock time (scheduled)" in which the scheduled start clock time of live migration is stored and "execution time (scheduled)" in which the scheduled execution time of live migration is stored. Moreover, the plan information 131 illustrated in FIG. 16 and so forth includes, as items, "start clock time" in which the actual start clock time of live migration is stored, "execution time" in which the actual execution time of live migration is stored, and "result" in which the execution result of live migration (whether or not live migration has been completed) is stored.

For example, in the information on the first row of the plan information 131 illustrated in FIG. 16, "PM1" is stored as "migration source PM" and "ABC" is stored as "target VM" and "PM2" is stored as "migration destination PM." Furthermore, "9:00" is stored as "start clock time (scheduled)" and "20 (minutes)" is stored as "execution time (scheduled)." In addition, in the information on the first row of the plan information 131 illustrated in FIG. 16, "–" indicating that information is not stored is stored in each of "start clock time," "execution time," and "result."

Furthermore, in the information on the second row of the plan information 131 illustrated in FIG. 16, "PM1" is stored as "migration source PM" and "DEF" is stored as "target VM" and "PM3" is stored as "migration destination PM." Moreover, "9:20" is stored as "start clock time (scheduled)" and "40 (minutes)" is stored as "execution time (scheduled)." In addition, in the information on the second row of the plan information 131 illustrated in FIG. 16, "–" is stored in each of "start clock time," "execution time," and "result." Explanation of the other pieces of information included in FIG. 16 is omitted.

Referring back to FIG. 10, when the LM execution timing comes (YES of S21), the migration executing unit 112 starts execution of live migration of the target VM 3 (S22).

The migration executing unit 112 may store the execution result of the live migration for which execution has been started in the processing of S22 in the plan information 131. A specific example of the plan information 131 when the execution result of live migration is stored will be described below.

FIG. 17 is a diagram explaining the specific example of the plan information 131 when the execution result of live migration is stored. For example, in the information on the first row of the plan information 131 illustrated in FIG. 17, "9:00" is stored as "start clock time" and "15 (minutes)" is stored as "execution time" and "success" is stored as "result."

Furthermore, in the information on the second row of the plan information 131 illustrated in FIG. 17, "9:15" is stored as "start clock time" and "60 (minutes)" is stored as "execution time" and "failure" is stored as "result."

For example, the information on the first row of the plan information 131 illustrated in FIG. 17 represents that live migration of the target VM 3 whose identification information is "ABC" has been completed in 60 minutes (live migration has succeeded without the occurrence of timeout). Furthermore, the information on the second row of the plan information 131 illustrated in FIG. 17 represents that live migration of the target VM 3 whose identification information is "DEF" has not been completed even after the elapse of 60 minutes (live migration has failed due to the occurrence of timeout). Explanation of the other pieces of information included in FIG. 17 is omitted.

Referring back to FIG. 10, if the existence of the target VM 3 about which timeout has occurred in the execution of the live migration is not detected (NO of S23), the management VM 3f ends the LM control processing.

For example, in this case, the management VM 3f determines that all of live migrations of the respective target VMs 3 have been completed without timeout, and ends the LM control processing.

On the other hand, if the existence of the target VM 3 about which timeout has occurred in the execution of the live migration is detected (YES of S23), the management VM 3f determines whether or not the cause of the timeout that has occurred about the target VM 3 existing in the processing of S23 is bandwidth insufficiency of the network NW (S24).

For example, the management VM 3f acquires the traffic amount in a physical switch (not illustrated) deployed in the network NW, for example. Then, for example, the management VM 3f determines that the cause of the timeout that has occurred about the target VM 3 is bandwidth insufficiency of the network NW if the sum of the bandwidth for communication in the acquired traffic amount and the bandwidth for transfer of data associated with the live migration of the target VM 3 is larger than the bandwidth of the network NW.

Then, if it is determined that the cause of the timeout that has occurred about the target VM 3 is bandwidth insufficiency of the network NW (YES of S25), for example, the migration executing unit 112 outputs information indicating that timeout of live migration has occurred due to bandwidth insufficiency of the network NW to output apparatus (not illustrated) (S26). Then, the management VM 3f ends the LM control processing.

Figure 11:
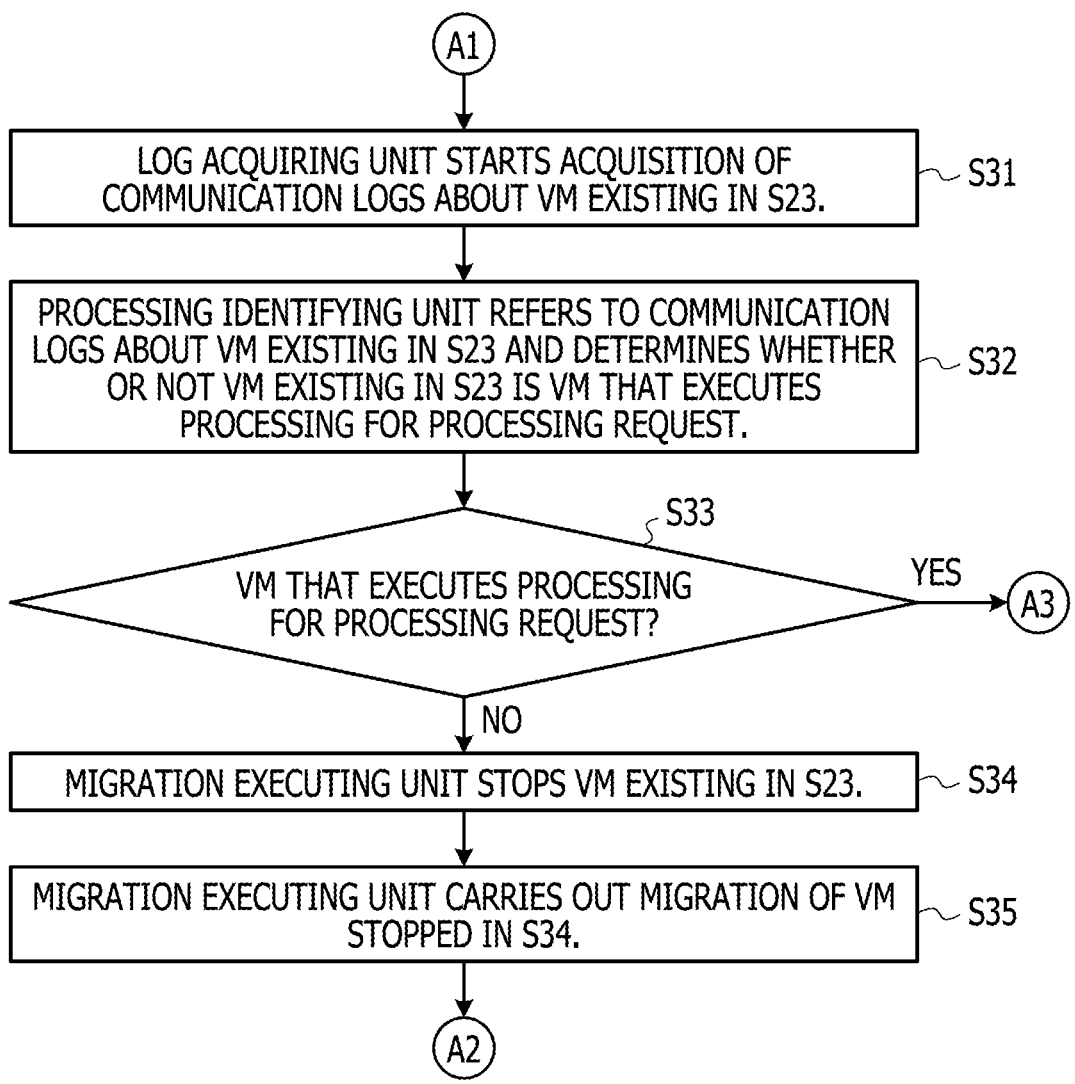
FIG. 11 is a flowchart diagram explaining details of an LM control processing in the first embodiment.

On the other hand, if it is determined that the cause of the timeout that has occurred about the target VM 3 is not bandwidth insufficiency of the network NW (NO of S25), as illustrated in FIG. 11, the log acquiring unit 113 of the management VM 3f starts acquisition of the communication logs 132 about the target VM 3 existing in the processing of S23 (S31).

Then, the processing identifying unit 115 of the management VM 3f refers to the communication logs 132 (first communication logs 132) about the target VM 3 existing in the processing of S23 and determines whether or not the target VM 3 existing in the processing of S23 is the VM 3 that executes processing for a processing request (S32). A specific example of the communication logs 132 will be described below.

FIG. 18 is a diagram explaining the specific example of the communication logs 132. On the first row of the communication logs 132 illustrated in FIG. 18, "11:38:37.060846 IP client2.63396>host1.8081: Flags [S], seq 3907359389, win 8192, options [mss 1460,nop,wscale 8,nop,nop,sackOK], length 0" is stored. Furthermore, on the second row of the communication logs 132 illustrated in FIG. 18, "11:38:37.078862 IP client2.63396>host1.8081: Flags [F.], seq 358, ack 21513, win 256, length 0" is stored. Explanation of the other pieces of information included in FIG. 18 is omitted.

Then, for example, the processing identifying unit 115 identifies the communication log 132 in which the transmission direction of the packet is the target VM 3 in the communication logs 132 illustrated in FIG. 18 and determines whether or not the TCP port number of the identified communication log 132 is smaller than "49152."

For example, on the first row of the communication logs 132 illustrated in FIG. 18, ">host1.8081" indicating that the host name of the transmission direction of the packet is host1 and the TCP port number is 8081 is included. Thus, for example, if the host name of the target VM 3 existing in the processing of S23 is host1, the processing identifying unit 115 determines that the target VM 3 existing in the processing of S23 is the VM 3 that executes processing for a processing request.

Referring back to FIG. 11, if it is determined that the target VM 3 existing in the processing of S23 is not the VM 3 that executes processing for a processing request (NO of S33), the migration executing unit 112 stops the target VM 3 existing in the processing of S23 (S34). Then, the migration executing unit 112 carries out migration of the target VM 3 stopped in the processing of S34 (S35). Thereafter, the management VM 3f ends the LM control processing.

For example, if the target VM 3 existing in the processing of S23 is not the VM 3 that executes processing for a processing request, the cloud computing business operator may determine that the influence on the services for users is small although the target VM 3 is stopped. For this reason, in this case, the migration executing unit 112 carries out migration involving the stop of the target VM 3 instead of live migration.

Figure 12:
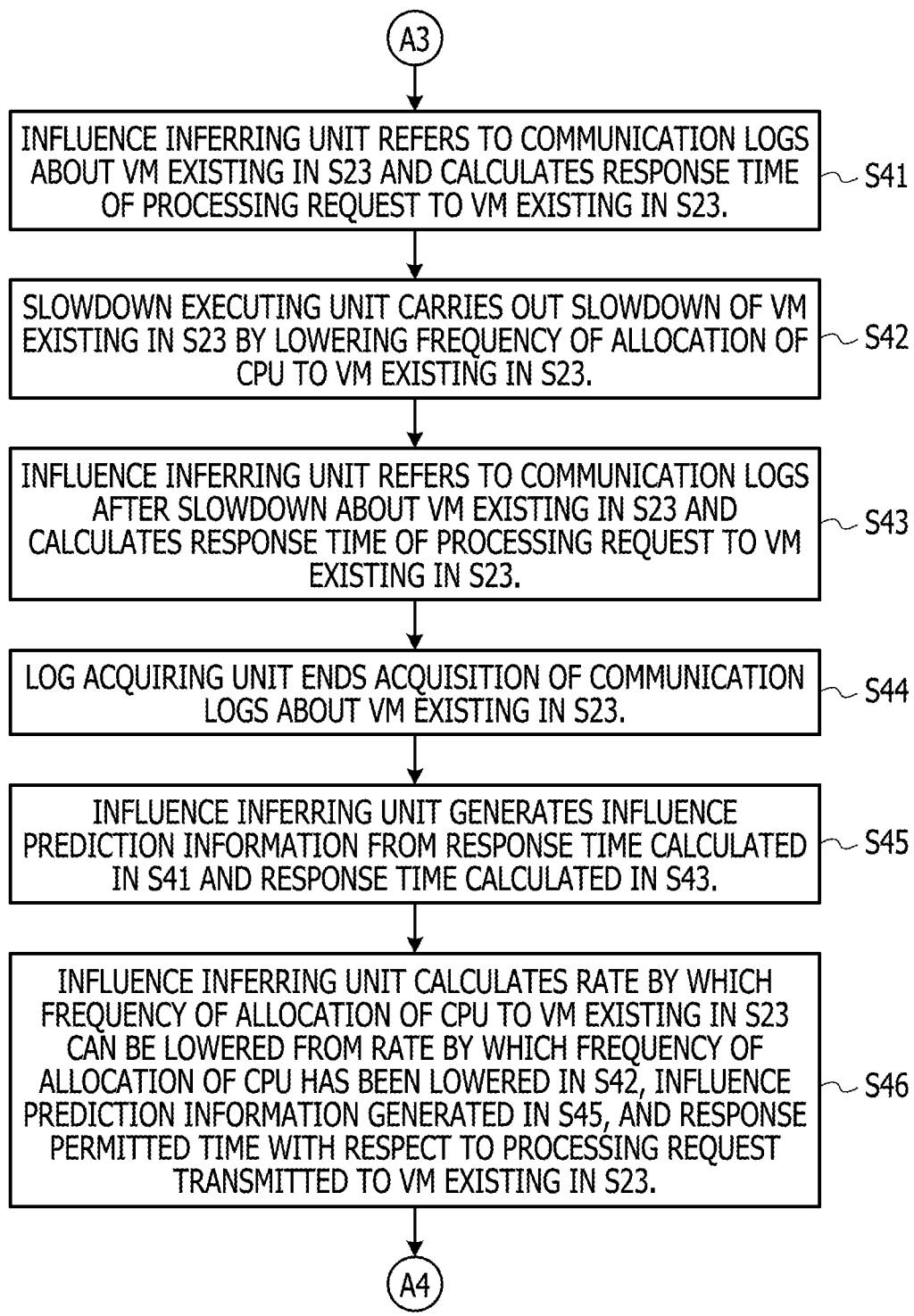
FIG. 12 is a flowchart diagram explaining details of an LM control processing in the first embodiment.

On the other hand, if it is determined that the target VM 3 existing in the processing of S23 is the VM 3 that executes processing for a processing request (YES of S33), as illustrated in FIG. 12, the influence inferring unit 114 refers to the communication logs 132 about the target VM 3 existing in the processing of S23 and calculates the response time (first response time) of a processing request to the target VM 3 existing in the processing of S23 (S41).

For example, in this case, the influence inferring unit 114 calculates the response time in the target VM 3 before slowdown is carried out.

For example, the influence inferring unit 114 identifies, from the communication logs 132 illustrated in FIG. 18, the communication log 132 including "client2.63396" indicating that the host name of the transmission source of the packet is client2 and the TCP port number is 63396 and "S" that is a flag indicating the start of a session (for example, communication log 132 on the first row). Furthermore, the influence inferring unit 114 identifies the communication log 132 including "client2.63396" and "F" that is a flag indicating the end of a session (for example, communication log 132 on the second row) from the communication logs 132 illustrated in FIG. 18, for example.

Then, the influence inferring unit 114 identifies "11:38:37.060846" and "11:38:37.078862" that are the clock times included in the respective identified communication logs 132 and works out, as the response time, "about 18 (ms)" that is the time obtained by subtracting "11:38:37.060846" from "11:38:37.078862", for example. If plural response times are calculated from the communication logs 132, the influence inferring unit 114 may calculate the average of the calculated response times.

Referring back to FIG. 12, the slowdown executing unit 116 of the management VM 3f carries out slowdown of the target VM 3 by lowering the frequency of assignment of the CPU to the target VM 3 existing in the processing of S23 (S42). For example, the slowdown executing unit 116 lowers the frequency of assignment of the CPU to the target VM 3 existing in the processing of S23 by 10(%), for example.

Then, the influence inferring unit 114 refers to the communication logs 132 (second communication logs 132) after the slowdown about the target VM 3 existing in the processing of S23 and calculates the response time (second response time) of a processing request to the target VM 3 existing in the processing of S23 (S43).

For example, in this case, the influence inferring unit 114 calculates the response time in the target VM 3 after the slowdown is carried out.

Subsequently, the log acquiring unit 113 ends the acquisition of the communication logs 132 about the target VM 3 existing in the processing of S23 (S44).

Then, the influence inferring unit 114 generates the influence prediction information 133 from the response time calculated in the processing of S41 and the response time calculated in the processing of S43 (S45). The influence prediction information 133 is information that represents change in the response time according to the execution of the slowdown of the target VM 3. Thereafter, the information management unit 111 stores the influence prediction information 133 generated by the influence inferring unit 114 in the information storage area 130, for example. A specific example of the influence prediction information 133 will be described below.

Figure 19:
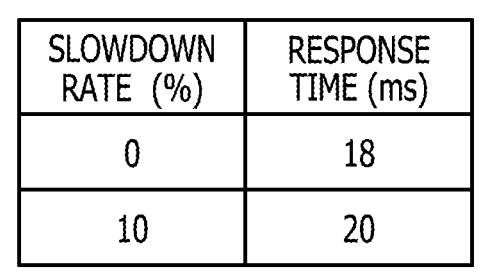

FIG. 19 is a diagram explaining the specific example of the influence prediction information 133. The influence prediction information 133 illustrated in FIG. 19 includes, as items, "slowdown rate" in which the lowering rate of the frequency of assignment of the CPU is stored and "response time" in which the response time with respect to a processing request transmitted from the operation terminal 2 is set.

For example, in the information on the first row of the influence prediction information 133 illustrated in FIG. 19, "0(%)" is stored as "slowdown rate" and "18 (ms)" is stored as "response time."

Furthermore, in the information on the second row of the influence prediction information 133 illustrated in FIG. 19, "10(%)" is stored as "slowdown rate" and "20 (ms)" is stored as "response time."

Referring back to FIG. 12, the influence inferring unit 114 calculates the rate (first rate) by which the frequency of assignment of the CPU to the target VM 3 existing in the processing of S23 may be lowered from the rate by which the frequency of assignment of the CPU has been lowered in the processing of S42, the influence prediction information 133 generated in the processing of S45, and the permitted value of the response time (hereinafter, referred to also as response permitted time) with respect to a processing request transmitted to the target VM 3 existing in the processing of S23 (S46). The response permitted time may be decided by the cloud computing business operator in advance, for example.

For example, the influence inferring unit 114 calculates the rate by which the frequency of assignment of the CPU to the target VM 3 existing in the processing of S23 may be lowered by using the following expression (1), for example.

Response time after slowdown=coefficient×response time before slowdown/(1−lowering rate of frequency of assignment)          expression (1)

First, the influence inferring unit 114 calculates "coefficient" in the above-described expression (1). For example, in the influence prediction information 133 explained with FIG. 19, the time corresponding to "response time before slowdown" is "18 (ms)" and the time corresponding to "response time after slowdown" is "20 (ms)." Thus, when "lowering rate of frequency of assignment" in the processing of S42 is "10(%)," the influence inferring unit 114 works out "1" as "coefficient."

Next, by using the above-described expression (1), the influence inferring unit 114 calculates "lowering rate of frequency of assignment" when "response time after slowdown" is the response permitted time and "response time before slowdown" is "18 (ms)" and "coefficient" is "1." For example, when the response permitted time is "300 (ms)," the influence inferring unit 114 works out "94(%)" as "lowering rate of frequency of assignment."

For example, in this case, it is possible for the management VM 3f to determine that "lowering rate of frequency of assignment" is desired to be suppressed to "94(%)" or lower in order to suppress "response time after slowdown" to "300 (ms)" or shorter.

Figure 13:
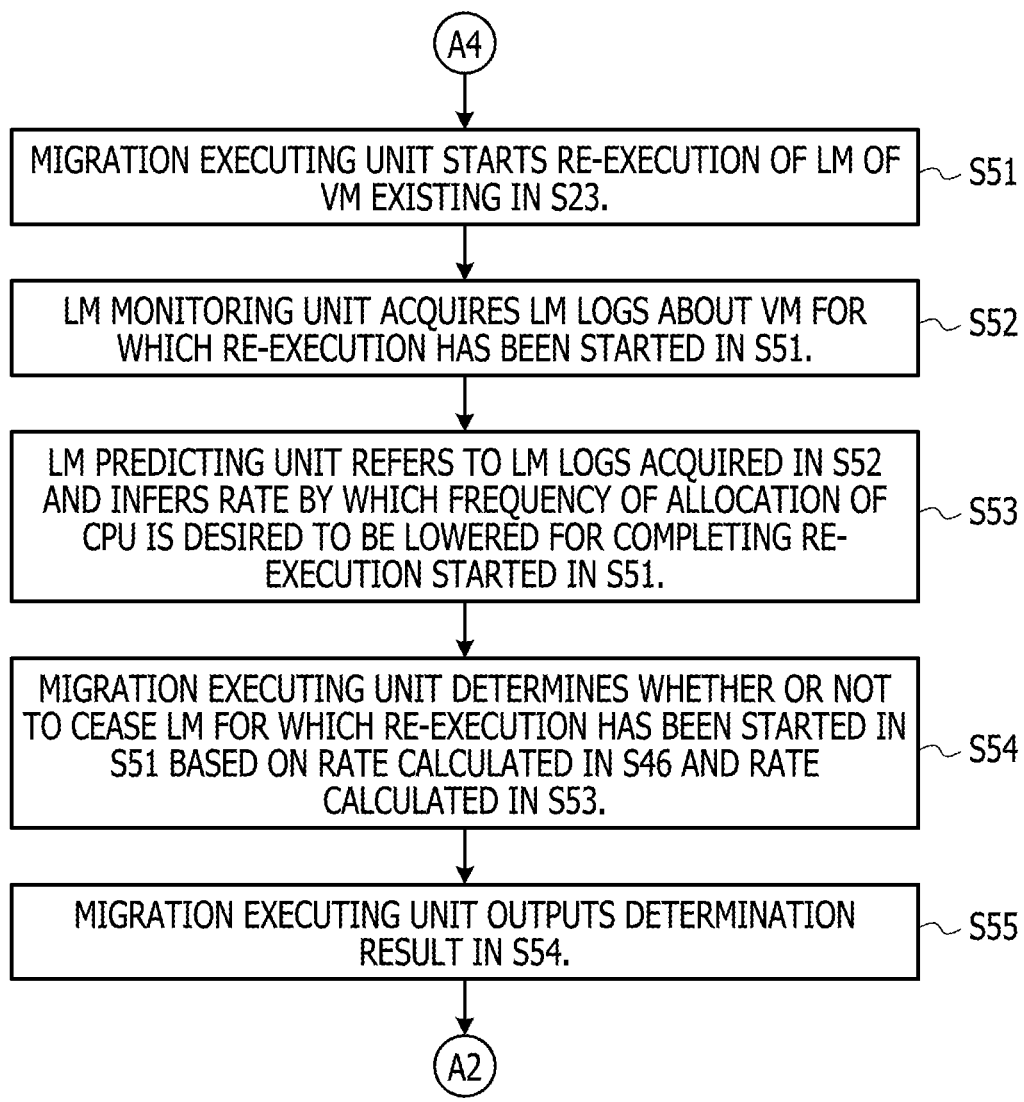
FIG. 13 is a flowchart diagram explaining details of an LM control processing in the first embodiment.

Thereafter, as illustrated in FIG. 13, the migration executing unit 112 starts re-execution of the live migration of the target VM 3 existing in the processing of S23 (S51).

Then, the LM monitoring unit 117 of the management VM 3f acquires the LM logs 134 about the target VM 3 for which the re-execution has been started in the processing of S51 (S52). The LM logs 134 are logs that represent the progress status of the live migration of the target VM 3. For example, the LM monitoring unit 117 accesses the physical machine 1 on which the target VM 3 for which the re-execution has been started in the processing of S51 operates and acquires the desired LM logs 134, for example. Then, the information management unit 111 stores the LM logs 134 acquired by the LM monitoring unit 117 in the information storage area 130, for example. Specific examples of the LM logs 134 will be described below.

FIG. 20 to FIG. 22 are diagrams explaining the specific examples of the LM logs 134. The LM logs 134 illustrated in FIG. 20 and so forth have, as items, "clock time" in which the generation clock time of each LM log 134 is stored, "status" in which the execution status about live migration of the target VM 3 is stored, and "lowering rate of frequency of assignment" in which the rate by which the frequency of assignment of the CPU to the target VM 3 has been lowered is stored. Furthermore, the LM logs 134 illustrated in FIG. 20 and so forth have, as items, "transferred data" in which the data amount of data transferred in association with execution of live migration of the target VM 3 is stored and "generated dirty page" in which the data amount of pages including data updated in transfer of data associated with execution of live migration of the target VM 3 (hereinafter, referred to also as dirty pages) is stored.

The migration executing unit 112 repeatedly carries out transfer of the dirty pages until the transfer time of the dirty pages generated at the time of the previous transfer becomes a given time or shorter. Thus, the number of times of transfer of the dirty pages is set in "status" in the LM logs 134, for example. Furthermore, when the transfer time of the dirty pages generated at the time of the previous transfer has become the given time or shorter, the migration executing unit 112 stops the target VM 3 and transfers the dirty pages that have not been transferred.

Moreover, in terms of enhancing the probability of completion of live migration, the slowdown executing unit 116 increases the lowering rate of the frequency of assignment by a given rate every time the number of times of transfer of the dirty pages increases. In the following, the description will be made based on the assumption that the slowdown executing unit 116 increases the lowering rate of the frequency of assignment by 10(%) in every increase.

For example, on the first row of the LM logs 134 illustrated in FIG. 20, "10:11:00" is stored as "clock time" and "LM start" indicating the start of live migration is stored as "status." In addition, "10(%)" is stored as "lowering rate of frequency of assignment" and "–" is stored as "transferred data" and "generated dirty page."

Furthermore, on the second row of the LM logs 134 illustrated in FIG. 20, "10:11:32" is stored as "clock time" and "Iter 1" indicating the first round of transfer is stored as "status." In addition, "20(%)" is stored as "lowering rate of frequency of assignment" and "32000 (MiB)" is set as "transferred data" and "17920 (MiB)" is set as "generated dirty page."

For example, the LM logs 134 illustrated in FIG. 20 represent that the data amount of all pieces of data transferred in association with re-execution of live migration of the target VM 3 is "32000 (MiB)" and dirty pages with a data amount of "17920 (MiB)" have been generated in the transfer of the data.

Referring back to FIG. 13, the LM predicting unit 118 of the management VM 3f refers to the LM logs 134 acquired in the processing of S52 and infers the rate (second rate) by which the frequency of assignment of the CPU is desired to be lowered for completing the re-execution started in the processing of S51 (S53). Details of the processing of S53 will be described below.

Figure 14:
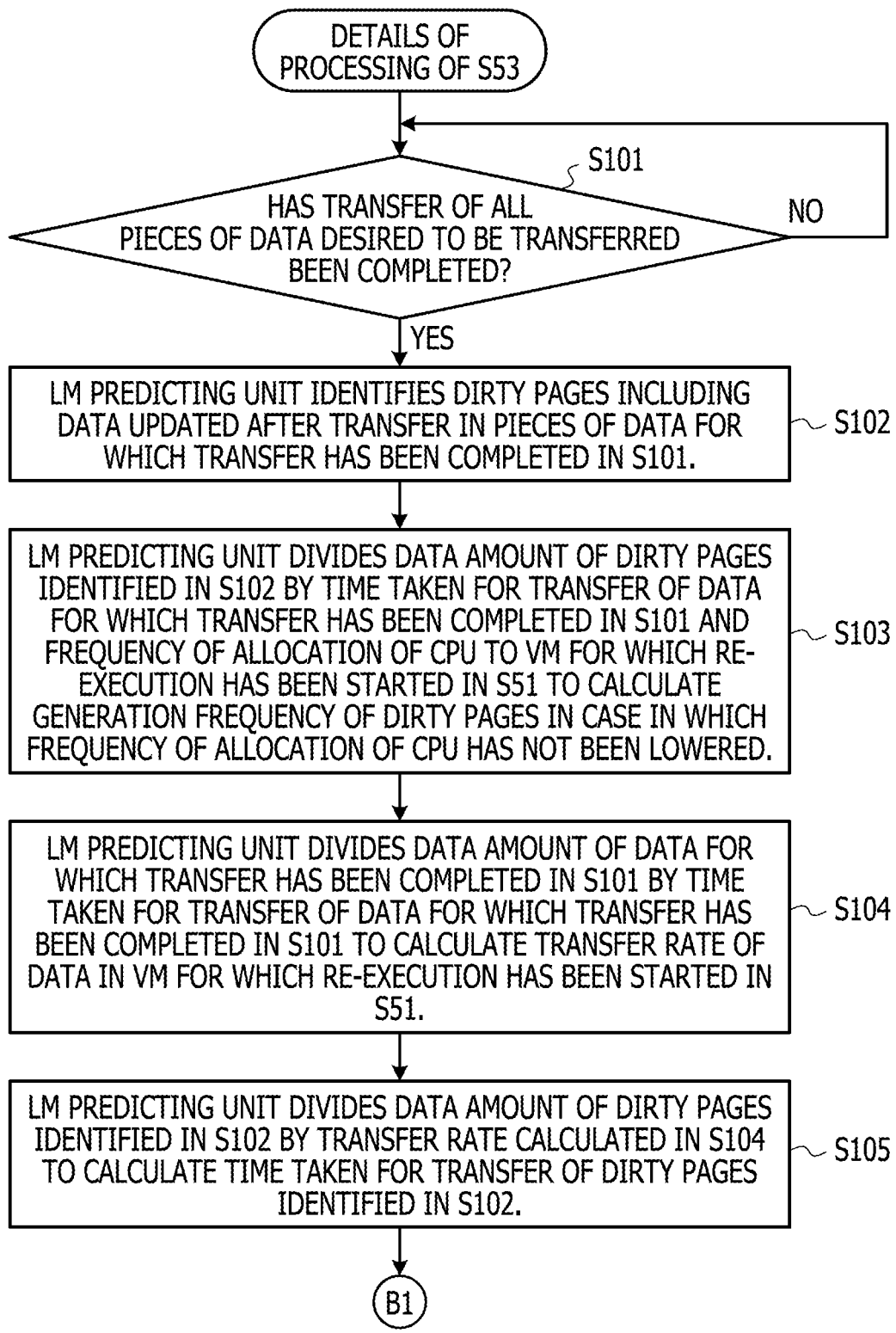
FIG. 14 is a flowchart diagram explaining details of an LM control processing in the first embodiment.
Figure 15:
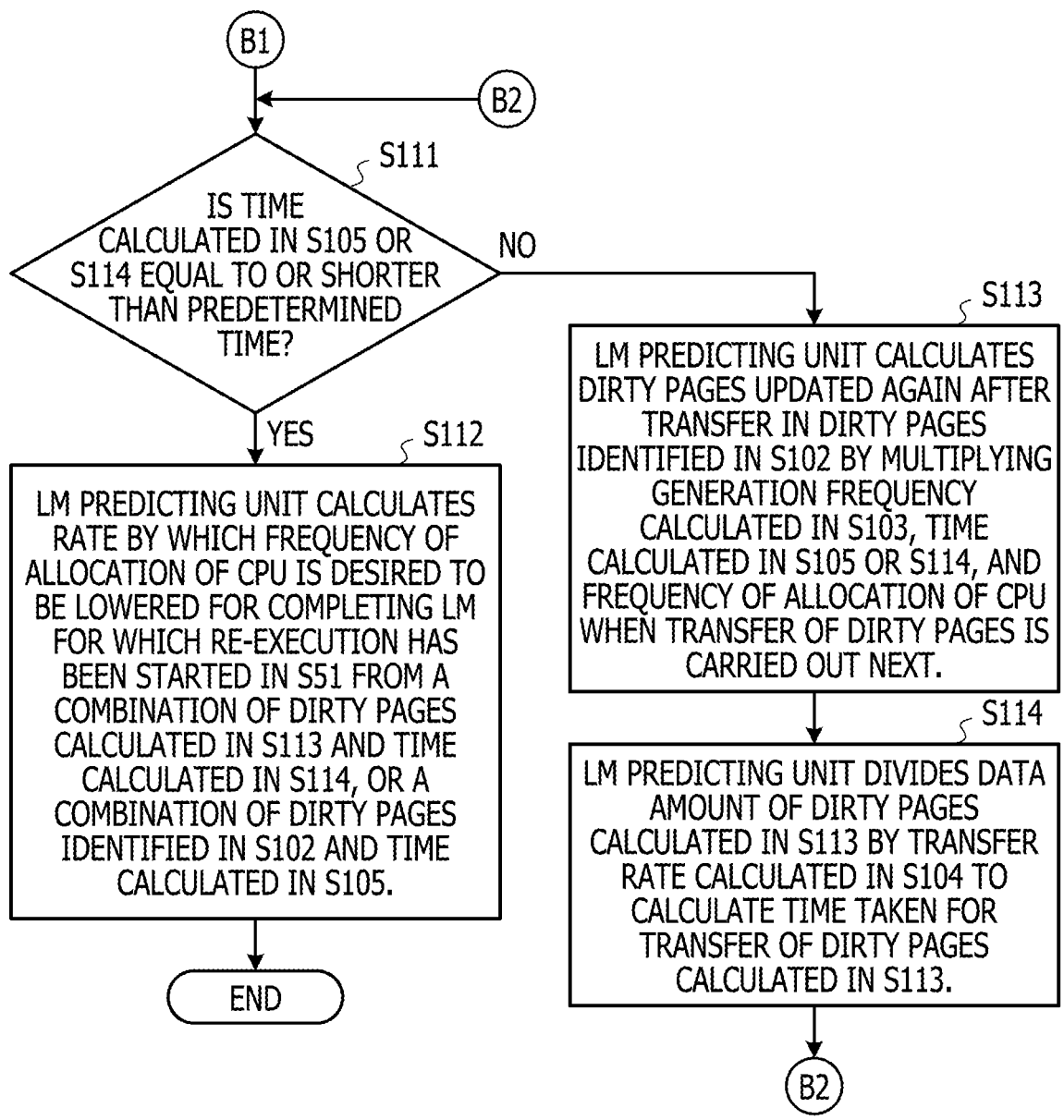
FIG. 15 is a flowchart diagram explaining details of an LM control processing in the first embodiment.

FIG. 14 and FIG. 15 are flowchart diagrams explaining the details of the processing of S53. As illustrated in FIG. 14, after the processing of S52, the LM predicting unit 118 waits until transfer (first round of transfer) of all pieces of data desired to be transferred in association with the execution of the live migration of the target VM 3 is completed (NO of S101).

Then, when the transfer of all pieces of data desired to be transferred in association with the execution of the live migration of the target VM 3 is completed (YES of S101), the LM predicting unit 118 identifies dirty pages including data updated after the transfer in the pieces of data for which the transfer has been completed in the processing of S101 (S102).

For example, the LM predicting unit 118 refers to the LM logs 134 explained with FIG. 20 and identifies "17920 (MiB)" set in "generated dirty page" of the information whose "status" is "Iter 1."

Subsequently, the LM predicting unit 118 divides the data amount of the dirty pages identified in the processing of S102 by the time taken for the transfer of the data for which the transfer has been completed in the processing of S101 and the present frequency of assignment of the CPU to the target VM 3 for which the re-execution has been started in the processing of S51 to calculate the generation frequency of the dirty pages in the case in which the frequency of assignment of the CPU has not been lowered (S103).

For example, on the first row and the second row of the LM logs 134 explained with FIG. 20, "10:11:00" and "10:11:32," respectively, are stored as "clock time." Furthermore, on the second row of the LM logs 134 explained with FIG. 20, "20(%)" is stored as "lowering rate of frequency of assignment" and "17920 (MiB)" is stored as "generated dirty page." Thus, the LM predicting unit 118 subtracts "0.2 (20(%))" from "1" to work out "0.8" as the present frequency of assignment of the CPU to the target VM 3. Thereafter, the LM predicting unit 118 divides "17920 (MiB)" by "32 (s)" and "0.8" to work out "700 (MiB/s)" as the generation frequency of the dirty pages in the case in which the frequency of assignment of the CPU has not been lowered.

Then, the LM predicting unit 118 divides the data amount of the data for which the transfer has been completed in the processing of S101 by the time taken for the transfer of the data for which the transfer has been completed in the processing of S101 to calculate the transfer rate of data in the target VM 3 for which the re-execution has been started in the processing of S51 (S104).

For example, on the second row of the LM logs 134 explained with FIG. 20, "32000 (MiB)" is stored as "transferred data." Thus, the LM predicting unit 118 divides "32000 (MiB)" by "32 (s)" to work out "1000 (MiB/s)" as the transfer rate of data.

Subsequently, the LM predicting unit 118 divides the data amount of the dirty pages identified in the processing of S102 by the transfer rate calculated in the processing of S104 to calculate (infer) the time taken for transfer of the dirty pages identified in the processing of S102 (S105).

For example, the LM predicting unit 118 divides "1000 (MiB/s)" by "17920 (MiB)" to work out "17.92 (s)" as the time taken for transfer of the dirty pages.

Thereafter, as illustrated in FIG. 15, the LM predicting unit 118 determines whether or not the time calculated in the processing of S105 or S114 is equal to or shorter than a given time (S111).

For example, if "17.92 (s)" is worked out as the time taken for transfer of the dirty pages in the processing of S105 and the given time is "0.3 (s)," the LM predicting unit 118 determines that the time calculated in the processing of S105 is not equal to or shorter than the given time.

Then, if it is determined that the time calculated in the processing of S105 or S114 is not equal to or shorter than the given time (NO of S111), the LM predicting unit 118 calculates (infers) the dirty pages updated again after the transfer in the dirty pages identified in the processing of S102 by multiplying the generation frequency of the dirty pages calculated in the processing of S103, the time calculated in the processing of S105 or S114, and the frequency of assignment of the CPU when transfer of the dirty pages is carried out next (S113).

For example, when the generation frequency of the dirty pages calculated in the processing of S103 is "700 (MiB/s)" and the time calculated in the processing of S105 is "17.92 (s)" and the frequency of assignment of the CPU when transfer of the dirty pages is carried out next is "0.7," the LM predicting unit 118 works out "8781 (MiB)" as the data amount of the dirty pages updated again after the transfer in the dirty pages identified in the processing of S102.

Then, the LM predicting unit 118 divides the data amount of the dirty pages calculated in the processing of S113 by the transfer rate of data calculated in the processing of S104 to calculate the time taken for transfer of the dirty pages calculated in the processing of S113 (S114).

For example, when the data amount of the dirty pages calculated in the processing of S113 is "8781 (MiB)" and the transfer rate of data calculated in the processing of S104 is "1000 (MiB/s)," the LM predicting unit 118 works out "8.781 (s)" as the time taken for transfer of the dirty pages calculated in the processing of S113.

For example, the information management unit 111 may store the LM logs 134 acquired in the processing of S52 in the information storage area 130 after adding information that represents the data amount of the dirty pages calculated in the processing of S113 and the time calculated in the processing of S114 (hereinafter, referred to also as inference information 134a) to the LM logs 134. In the following, a description will be made about a specific example of the LM logs 134 in which the inference information 134a is included about the case in which the second round of data transfer is carried out.

FIG. 21 and FIG. 22 are diagrams explaining specific examples of the LM logs 134 in which the inference information 134a is included. For example, FIG. 21 is a diagram explaining the specific example of the LM logs 134 in which the inference information 134a is included about the case in which the second round of data transfer is carried out.

On the second row of the LM logs 134 explained with FIG. 20, "17920 (MiB)" is stored as "generated dirty page." Thus, if "1000 (MiB/s)" has been worked out as the transfer rate of data, the LM predicting unit 118 divides "17920 (MiB)" by "1000 (MiB/s)" to work out "(about) 18 (s)." Furthermore, on the second row of the LM logs 134 explained with FIG. 20, "10:11:32" is stored as "clock time." Thus, as illustrated in FIG. 21, the LM predicting unit 118 stores "10:11:50" that is the clock time obtained by adding "18 (s)" to "10:11:32" in "clock time" on the third row of the LM logs 134, for example.

Moreover, as illustrated in FIG. 21, for example, the LM predicting unit 118 stores "Iter 2" as "status" on the third row of the LM logs 134 and stores "30(%)" as "lowering rate of frequency of assignment." In addition, the LM predicting unit 118 stores "17920 (MiB)" as "transferred data" and stores "8781 (MiB)" as "generated dirty page."

Referring back to FIG. 15, the LM predicting unit 118 executes the processing of S111 and the subsequent processing again after the processing of S114. Then, if it is determined that the time calculated in the processing of S105 or S114 is equal to or shorter than the given time (YES of S111), the LM predicting unit 118 calculates the rate by which the frequency of assignment of the CPU is desired to be lowered for completing the live migration for which the re-execution has been started in the processing of S51 from a combination of the dirty pages calculated in the processing of S113 and the time calculated in the processing of S114, or a combination of the dirty pages identified in the processing of S102 and the time calculated in the processing of S105 (S112). In the following, a description will be made about a specific example of the LM logs 134 in which the inference information 134a is included about the case in which the seventh round of data transfer is carried out.

FIG. 22 is a diagram explaining the specific example of the LM logs 134 in which the inference information 134a is included about the case in which the seventh round of data transfer is carried out. As illustrated in FIG. 22, the LM predicting unit 118 adds the new inference information 134a that represents the data amount of the dirty pages calculated in the processing of S113 and the time calculated in the processing of S114 to the LM logs 134 every time the processing of S113 and S114 is executed similarly to the case explained with FIG. 21.

Here, on the eighth row of the LM logs 134 illustrated in FIG. 22, "11 (MiB)" is stored in "generated dirty page." Thus, if "1000 (MiB/s)" has been worked out as the transfer rate of data, the LM predicting unit 118 divides "11 (MiB)" by "1000 (MiB/s)" to work out "11 (ms)." Therefore, for example, if the given time in the processing of S111 is "30 (ms)," the LM predicting unit 118 determines that the time calculated in the processing of S114 is equal to or shorter than the given time.

Moreover, on the eighth row of the LM logs 134 illustrated in FIG. 22, "80(%)" is stored as "lowering rate of frequency of assignment." Thus, in this case, the LM predicting unit 118 works out "80(%)" as the rate by which the frequency of assignment of the CPU is desired to be lowered for completing the live migration for which the re-execution has been started in the processing of S51.

Referring back to FIG. 13, the migration executing unit 112 determines whether or not to cease the LM for which the re-execution has been started in the processing of S51 based on the rate calculated in the processing of S46 and the rate calculated in the processing of S53 (S54).

For example, on the eighth row of the LM logs 134 illustrated in FIG. 22, "80(%)" is set as "lowering rate of frequency of assignment." For example, the LM logs 134 illustrated in FIG. 22 indicate that the frequency of assignment of the CPU to the target VM 3 is desired to be lowered by 80(%) for completing the live migration for which the re-execution has been started in the processing of S51.

Thus, for example, if the rate calculated in the processing of S46 is "94(%)," the LM predicting unit 118 determines that the rate calculated in the processing of S46 is higher than the rate calculated in the processing of S53. Therefore, in this case, the LM predicting unit 118 determines that there is no need to cease the live migration for which the re-execution has been started in the processing of S51, for example.

Thereafter, the migration executing unit 112 outputs the determination result in the processing of S54 (S55). Specific examples of the determination result output in the processing of S55 will be described below.

FIG. 23 and FIG. 24 are diagrams explaining the specific examples when the determination result output in the processing of S55 is output to output apparatus (not illustrated). In the examples illustrated in FIG. 23 and FIG. 24, it is indicated that "response time (normal)" that represents the response time calculated in the processing of S41 is "18 (ms)" and "timeout of response time" that represents the response permitted time is "300 (ms)" and "permissible slowdown" that is the rate calculated in the processing of S46 is "94(%)."

Furthermore, in the example illustrated in FIG. 23, it is indicated that "Iteration" that represents the number of times of transfer of data actually carried out is "1 (time)" and "slowdown" that represents the rate of lowering of the frequency of assignment of the CPU actually carried out is "20(%)." In addition, it is indicated that "transferred data" that represents the data amount of data actually transferred is "32000 (MiB)" and "generated dirty page" that represents the data amount of the dirty pages actually generated is "17920 (MiB)."

Moreover, in the example illustrated in FIG. 23, it is indicated that "predicted Iteration" that represents the number of times of transfer of data desired in order for the transfer time of data to be equal to or shorter than the given time in the processing of S111 is "7 (times)" and "predicted slowdown" that represents the rate by which the frequency of assignment of the CPU is desired to be lowered in order to cause the transfer time of data to be equal to or shorter than the given time in the processing of S111 is "80(%)." In addition, it is indicated that "status" that represents the determination result about whether or not there is a need to cease the live migration for which re-execution has been started in the processing of S51 is "LM is continued because it is anticipated that influence on business does not occur."

On the other hand, in the example illustrated in FIG. 24, it is indicated that "Iteration" that represents the number of times transfer of data has been actually carried out is "1 (time)" and "slowdown" that represents the rate of lowering of the frequency of assignment of the CPU actually carried out is "20(%)." In addition, it is indicated that "transferred data" that represents the data amount of data actually transferred is "32000 (MiB)" and "generated dirty page" that represents the data amount of the dirty pages generated when data is actually transferred is "28160 (MiB)."

Moreover, in the example illustrated in FIG. 24, it is indicated that "predicted Iteration" that represents the number of times of transfer of data desired in order for the transfer time of data to be equal to or shorter than the given time in the processing of S111 is "9 (times)" and "predicted slowdown" that represents the rate by which the frequency of assignment of the CPU is desired to be lowered in order to cause the transfer time of data to be equal to or shorter than the given time in the processing of S111 is "99(%)." In addition, it is indicated that "status" that represents the determination result about whether or not there is a need to cease the live migration for which re-execution has been started in the processing of S51 is "LM is suspended because it is anticipated that influence on business occurs."

As above, if execution of live migration of the target VM 3 is not completed in the given time, the management VM 3f in the present embodiment acquires the first communication logs 132 about the target VM 3. Then, the management VM 3f calculates the first response time of a processing request to the target VM 3 based on the acquired first communication logs 132.

Subsequently, the management VM 3f lowers the frequency of assignment of the CPU to the target VM 3 and thereafter acquires the second communication logs 132 about the target VM 3. Then, the management VM 3f calculates the second response time of a processing request to the target VM 3 based on the acquired second communication logs 132.

Thereafter, the management VM 3f calculates the first rate by which the frequency of assignment may be lowered based on the rate by which the frequency of assignment has been lowered, the first response time, the second response time, and the time permitted as the response time of a processing request to the target VM 3. Then, after start of re-execution of the live migration of the target VM 3, the management VM 3f calculates the second rate by which the frequency of assignment is desired to be lowered for completing the re-execution based on the progress status of the re-execution. Moreover, the management VM 3f determines whether or not to cease the re-execution of the live migration based on the first rate and the second rate.

For example, the management VM 3f carries out slowdown of the target VM 3 in a range in which the response time with respect to a processing request from a user does not exceed the permitted time and suppresses the frequency of update of data in execution of the live migration of the target VM 3.

This allows the management VM 3f to complete the live migration of the target VM 3 while keeping the services provided to users by the cloud computing user from being affected. For example, it becomes possible for the management VM 3f to complete the live migration of the target VM 3 while suppressing the occurrence of an error and so forth associated with delay in the response time of a processing request from a user to the target VM 3.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A migration control apparatus comprising:
   a memory; and
   a processor coupled to the memory and the processor configured to
   acquire a first communication log regarding a first virtual machine when execution of migration of the first virtual machine is not completed in a specific time,
   perform, based on the acquired first communication logs, calculation of a first response time of a first processing request to the first virtual machine,
   acquire a second communication log regarding the first virtual machine after lowering frequency of assignment of a computing resource to the first virtual machine to a first rate,
   perform, based on the acquired second communication log, calculation of a second response time of a second processing request to the first virtual machine,
   calculate, based on the first response time, the second response time, the first rate, and an allowable range of a response time, a second rate to which the frequency of assignment of the computing resource to the first virtual machine is permitted to be lowered,
   after start of re-execution of the migration of the first virtual machine, perform, based on a progress status of the re-execution, calculation of a third rate by which the frequency of allocation is desired to be lowered for completing the re-execution, and
   perform, based on a comparison of the second rate and the third rate, determination of whether to cease the re-execution.

2. The migration control apparatus according to claim 1, wherein
   the calculation of a first response time includes calculating, as the first response time, a time from a clock time when a session used for communication of the first processing request to the first virtual machine starts to a clock time when the session ends.

3. The migration control apparatus according to claim 1, wherein
   the calculation of the second response time includes calculating, as the second response time, a time from a clock time when a session used for communication of the second processing request to the first virtual machine starts to a clock time when the session ends.

4. The migration control apparatus according to claim 1, wherein the calculation of the third rate includes
after transferring first data in the re-execution, identifying, from the first data, second data updated after the transferring of the first data,
calculating generation frequency of the second data by dividing a data amount of the identified second data by a time taken for the transferring of the first data and a rate of the frequency of assignment of the computing resource, and
calculating the third rate based on the data amount of the second data and the calculated generation frequency of the second data.

5. The migration control apparatus according to claim 4, wherein
the calculation of the third rate includes
calculating a transfer rate of data by dividing a data amount of the first data by the time taken for the transferring of the first data,
calculating a time taken for transferring of the second data by dividing the data amount of the second data by the transfer rate, and
in a case where the calculated time taken for the transferring of the second data is not longer than a threshold, determining, as the third rate, the rate of the frequency of assignment of the computing resource when the transferring of the first data is performed.

6. The migration control apparatus according to claim 5, wherein
the calculation of the third rate includes
in a case where the calculated time taken for the transferring of the second data is longer than the threshold, estimating a data amount of third data updated after the transferring of the second data by multiplying the calculated time taken for the transferring of the second data, the calculated generation frequency of the second data, and the frequency of assignment of the computing resource when the transferring of the second data is performed,
calculating a time taken for transferring of the third data by dividing the estimated data amount of the third data by the transfer rate, and
in a case where the calculated time taken for the transferring of the third data is not longer than the threshold, determining, as the third rate, the rate of the frequency of assignment of the computing resource when the transferring of the second data is performed.

7. The migration control apparatus according to claim 6, wherein
the calculation of the third rate includes
when the calculated time taken for the transferring of the third data is longer than the threshold, repeatedly executing processing of estimating a data amount and calculating a time taken for transferring while changing a rate of the frequency of assignment of the computing resource until a time taken for transferring of data updated after transferring becomes equal to or shorter than the threshold.

8. The migration control apparatus according to claim 6, wherein
the frequency of assignment of the computing resource when the transferring of the second data is performed is lower than the frequency of assignment of the computing resource when the transferring of the first data is performed, and
the frequency of assignment of the computing resource when the transferring of the third data is performed is lower than the frequency of assignment of the computing resource when the transferring of the second data is performed.

9. The migration control apparatus according to claim 1, wherein
the determination of whether or not to cease the re-execution includes determining to cease the re-execution of the migration when the third rate is lower than the second rate.

10. A computer-implemented migration control method comprising:
acquiring a first communication log regarding a first virtual machine when execution of migration of the first virtual machine is not completed in a specific time;
calculating, based on the acquired first communication logs, a first response time of a first processing request to the first virtual machine;
acquiring a second communication log regarding the first virtual machine after lowering frequency of assignment of a computing resource to the first virtual machine to a first rate;
calculating, based on the acquired second communication log, a second response time of a second processing request to the first virtual machine;
calculating, based on the first response time, the second response time, the first rate, and an allowable range of a response time, a second rate to which the frequency of assignment of the computing resource to the first virtual machine is permitted to be lowered;
after start of re-execution of the migration of the first virtual machine, perform, based on a progress status of the re-execution, calculation of a third rate by which the frequency of allocation is desired to be lowered for completing the re-execution, and
determining, based on a comparison of the second rate and the third rate, whether to cease the re-execution.

11. The migration control method according to claim 10, wherein
the calculating of a first response time includes calculating, as the first response time, a time from a clock time when a session used for communication of the first processing request to the first virtual machine starts to a clock time when the session ends.

12. The migration control method according to claim 10, wherein
the calculating of the second response time includes calculating, as the second response time, a time from a clock time when a session used for communication of the second processing request to the first virtual machine starts to a clock time when the session ends.

13. The migration control method according to claim 10, wherein
the calculating of the third rate includes
after transferring first data in the re-execution, identifying, from the first data, second data updated after the transferring of the first data,
calculating generation frequency of the second data by dividing a data amount of the identified second data by a time taken for the transferring of the first data and a rate of the frequency of assignment of the computing resource, and
calculating the third rate based on the data amount of the second data and the calculated generation frequency of the second data.

14. The migration control method according to claim 13, wherein
the calculating of the third rate includes calculating a transfer rate of data by dividing a data amount of the first data by the time taken for the transferring of the first data, calculating a time taken for transferring of the second data by dividing the data amount of the second data by the transfer rate, and in a case where the calculated time taken for the transferring of the second data is not longer than a threshold, determining, as the third rate, the rate of the frequency of assignment of the computing resource when the transferring of the first data is performed.

15. The migration control method according to claim 14, wherein the calculating of the third rate includes in a case where the calculated time taken for the transferring of the second data is longer than the threshold, estimating a data amount of third data updated after the transferring of the second data by multiplying the calculated time taken for the transferring of the second data, the calculated generation frequency of the second data, and the frequency of assignment of the computing resource when the transferring of the second data is performed, calculating a time taken for transferring of the third data by dividing the estimated data amount of the third data by the transfer rate, and in a case where the calculated time taken for the transferring of the third data is not longer than the threshold, determining, as the third rate, the rate of the frequency of assignment of the computing resource when the transferring of the second data is performed.

16. The migration control method according to claim 15, wherein the calculating of the third rate includes when the calculated time taken for the transferring of the third data is longer than the threshold, repeatedly executing processing of estimating a data amount and calculating a time taken for transferring while changing a rate of the frequency of assignment of the computing resource until a time taken for transferring of data updated after transferring becomes equal to or shorter than the threshold.

17. The migration control method according to claim 15, wherein the frequency of assignment of the computing resource when the transferring of the second data is performed is lower than the frequency of assignment of the computing resource when the transferring of the first data is performed, and the frequency of assignment of the computing resource when the transferring of the third data is performed is lower than the frequency of assignment of the computing resource when the transferring of the second data is performed.

18. The migration control method according to claim 10, wherein the determining of whether or not to cease the re-execution includes determining to cease the re-execution of the migration when the third rate is lower than the second rate.

19. A non-transitory computer-readable medium storing instructions executable by one or more computers, the instructions comprising:

one or more instructions for acquiring a first communication log regarding a first virtual machine when execution of migration of the first virtual machine is not completed in a specific time;

one or more instructions for calculating, based on the acquired first communication logs, a first response time of a first processing request to the first virtual machine;

one or more instructions for acquiring a second communication log regarding the first virtual machine after lowering frequency of assignment of a computing resource to the first virtual machine to a first rate;

one or more instructions for calculating, based on the acquired second communication log, a second response time of a second processing request to the first virtual machine;

one or more instructions for calculating, based on the first response time, the second response time, the first rate, and an allowable range of a response time, a second rate to which the frequency of assignment of the computing resource to the first virtual machine is permitted to be lowered;

one or more instructions for, after start of re-execution of the migration of the first virtual machine, perform, based on a progress status of the re-execution, calculation of a third rate by which the frequency of allocation is desired to be lowered for completing the re-execution, and one or more instructions for determining, based on a comparison of the second rate and the third rate, whether to cease the re-execution.

* * * * *